(12) United States Patent
Swett

(10) Patent No.: US 6,633,106 B1
(45) Date of Patent: Oct. 14, 2003

(54) AXIAL GAP MOTOR-GENERATOR FOR HIGH SPEED OPERATION

(76) Inventor: Dwight W. Swett, 5342 W. 123rd St., Hawthorne, CA (US) 90250

( * ) Notice: Subject to any disclaimer, the term of this patent is extended or adjusted under 35 U.S.C. 154(b) by 0 days.

(21) Appl. No.: 09/566,693

(22) Filed: May 8, 2000

Related U.S. Application Data

(60) Provisional application No. 60/156,746, filed on Sep. 30, 1999.

(51) Int. Cl.$^7$ ................................................. H02K 1/22
(52) U.S. Cl. ..................................................... 310/268
(58) Field of Search ............................ 310/268, 156.21, 310/154.29, 154.21, 154.22, 154.45; H02K 1/27, 1/22

(56) References Cited

U.S. PATENT DOCUMENTS

| | | | |
|---|---|---|---|
| 4,058,024 A | 11/1977 | Gordon | 74/572 |
| 4,080,845 A | 3/1978 | Hatch | 74/572 |
| 4,343,203 A | 8/1982 | Jacobson et al. | 74/5 R |
| 4,394,594 A | 7/1983 | Schmider et al. | 310/68 R |
| 4,537,091 A | 8/1985 | Kulkarni et al. | 74/572 |
| 4,723,735 A | 2/1988 | Eisenhaure et al. | 244/165 |
| 4,821,599 A | 4/1989 | Medlicott | 74/572 |
| 4,991,462 A | 2/1991 | Breslich, Jr. et al. | 74/572 |
| 4,996,457 A | 2/1991 | Hawsey et al. | 310/268 |
| 5,124,605 A * | 6/1992 | Bitterly et al. | 310/74 |
| 5,268,608 A | 12/1993 | Bitterly et al. | 310/90 |
| 5,311,092 A | 5/1994 | Fisher | 310/266 |
| 5,466,977 A | 11/1995 | Bitterly et al. | 310/74 |
| 5,562,582 A | 10/1996 | Malekmadani | 494/16 |
| 5,566,588 A | 10/1996 | Bakholdin et al. | 74/572 |
| 5,586,471 A | 12/1996 | Nardone et al. | 74/572 |
| 5,614,777 A | 3/1997 | Bitterly et al. | 310/74 |
| 5,619,087 A | 4/1997 | Sakai | 310/268 |
| 5,633,545 A | 5/1997 | Albrecht et al. | 310/67 R |
| 5,679,995 A * | 10/1997 | Nagate et al. | 310/156.54 |
| 5,710,471 A | 1/1998 | Syverson et al. | 310/114 |
| 5,729,903 A | 3/1998 | Bitterly et al. | 29/894 |
| 5,732,603 A | 3/1998 | Swett et al. | 74/572 |
| 5,816,114 A | 10/1998 | Gregoire et al. | 74/572 |
| 6,014,911 A | 1/2000 | Swett | 74/572 |
| 6,181,048 B1 * | 1/2001 | Smith et al. | 310/261 |

FOREIGN PATENT DOCUMENTS

SU 973970 4/1981
SU 125732 12/1984

* cited by examiner

*Primary Examiner*—Nestor Ramirez
*Assistant Examiner*—Karen Addison
(74) *Attorney, Agent, or Firm*—Sullivan Law Group

(57) ABSTRACT

An axial gap motor-generator of the type coupled to a shaft having an axis of rotation. The motor-generator comprises a rotor having a rotor body rotatably disposed about the shaft and having an outer region. The rotor includes a plurality of openings disposed in the outer region and spaced from one another. Each of the openings includes an outer edge. The motor-generator also includes a plurality of magnets equal in number to the openings. Each of the magnets includes an outer edge corresponding to the outer edge of a corresponding one of the openings. The outer edge of the magnets generally is non-conformal to and is slightly smaller than the outer edge of the openings, and each of the magnets is shaped to be inserted into the corresponding one of the openings. The motor-generator further includes a stator assembly positioned adjacent to the rotor. The stator assembly includes windings positioned to be adjacent to the magnets when the rotor is rotated. The outer edge of each of the magnets is dimensioned to substantially conform to the outer edge of the corresponding one of the openings when the axial gap motor-generator is operated at the operational speed and the outer edge of the corresponding one of the openings is thereby deformed. The motor-generator further includes a backiron assembly that is adapted to conform to the rotor when the rotor is operated at its operational state. A vibration isolator also is provided for isolating vibrations of the motor-generator from the shaft. Related methods also are provided.

16 Claims, 18 Drawing Sheets

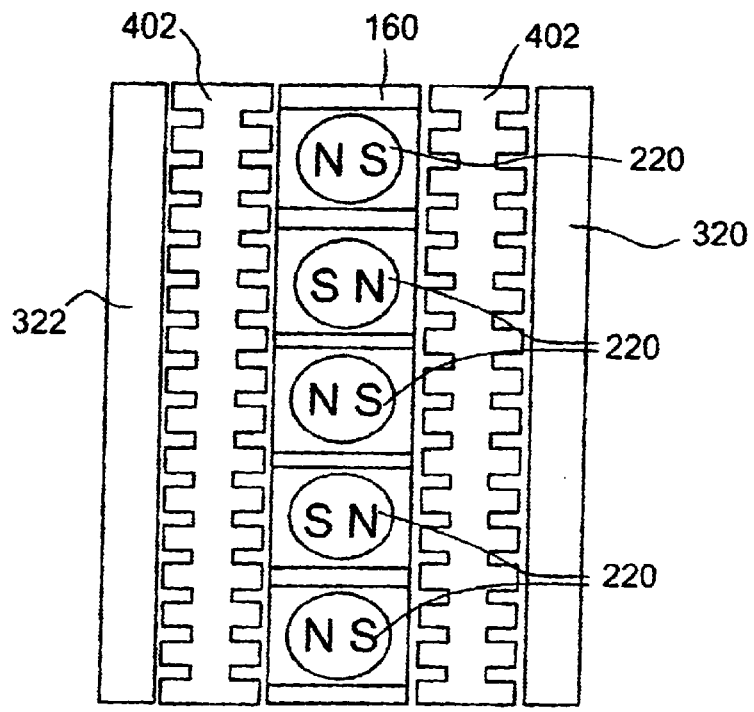
FIG. 9
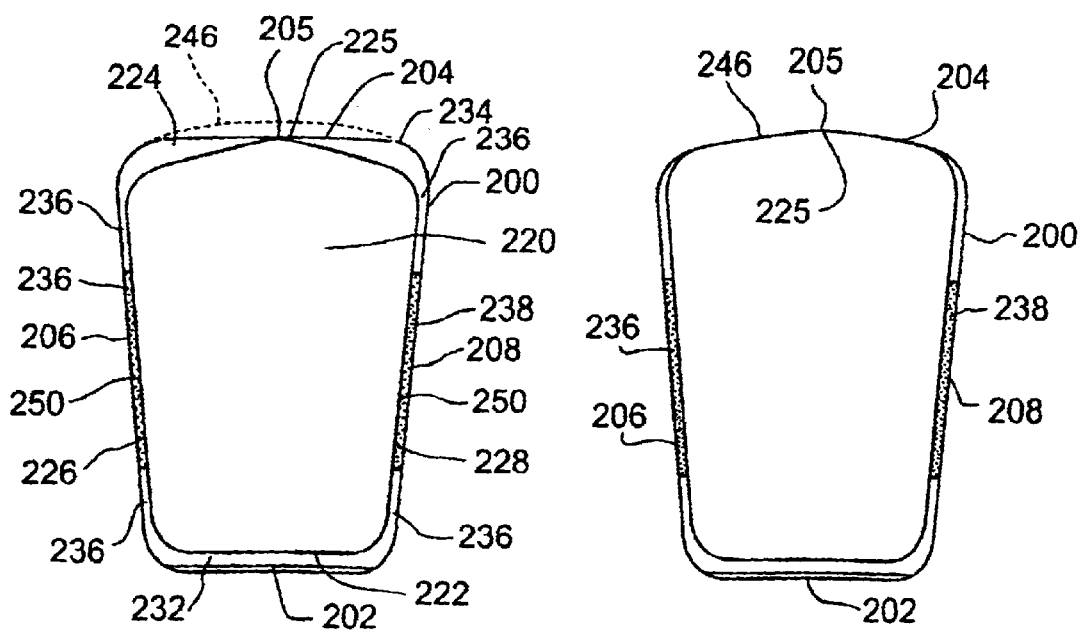
FIG. 10  FIG 11

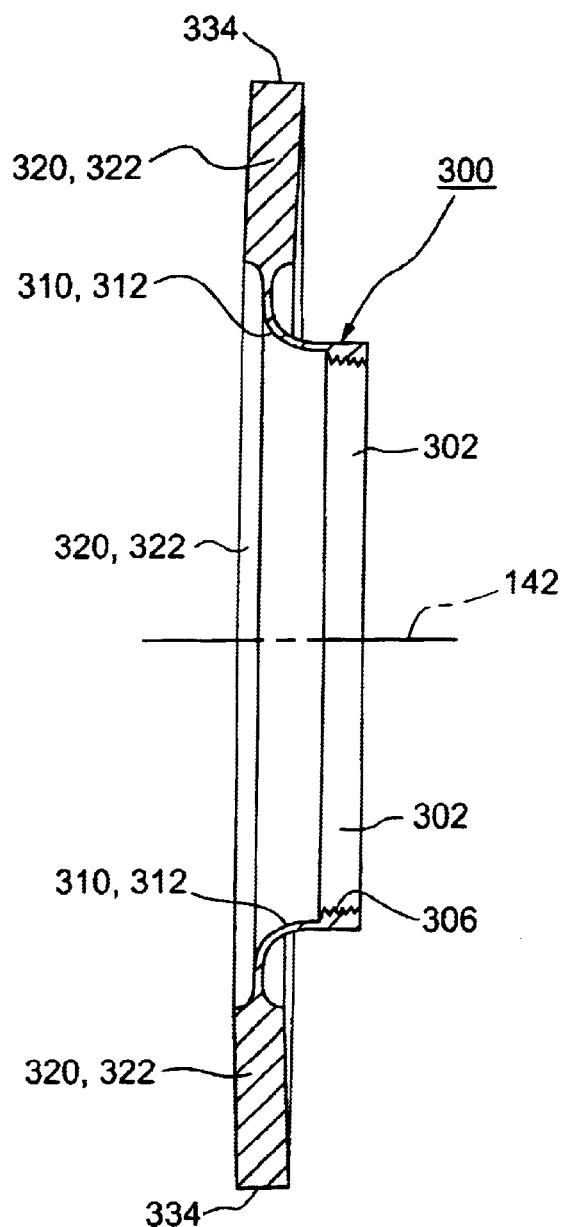
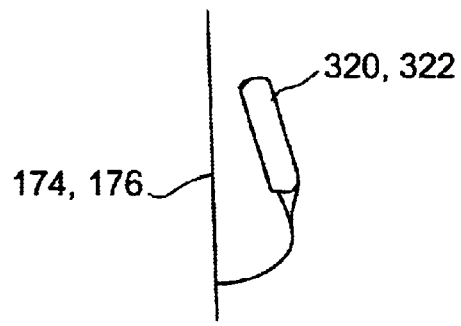
FIG 15
FIG. 16

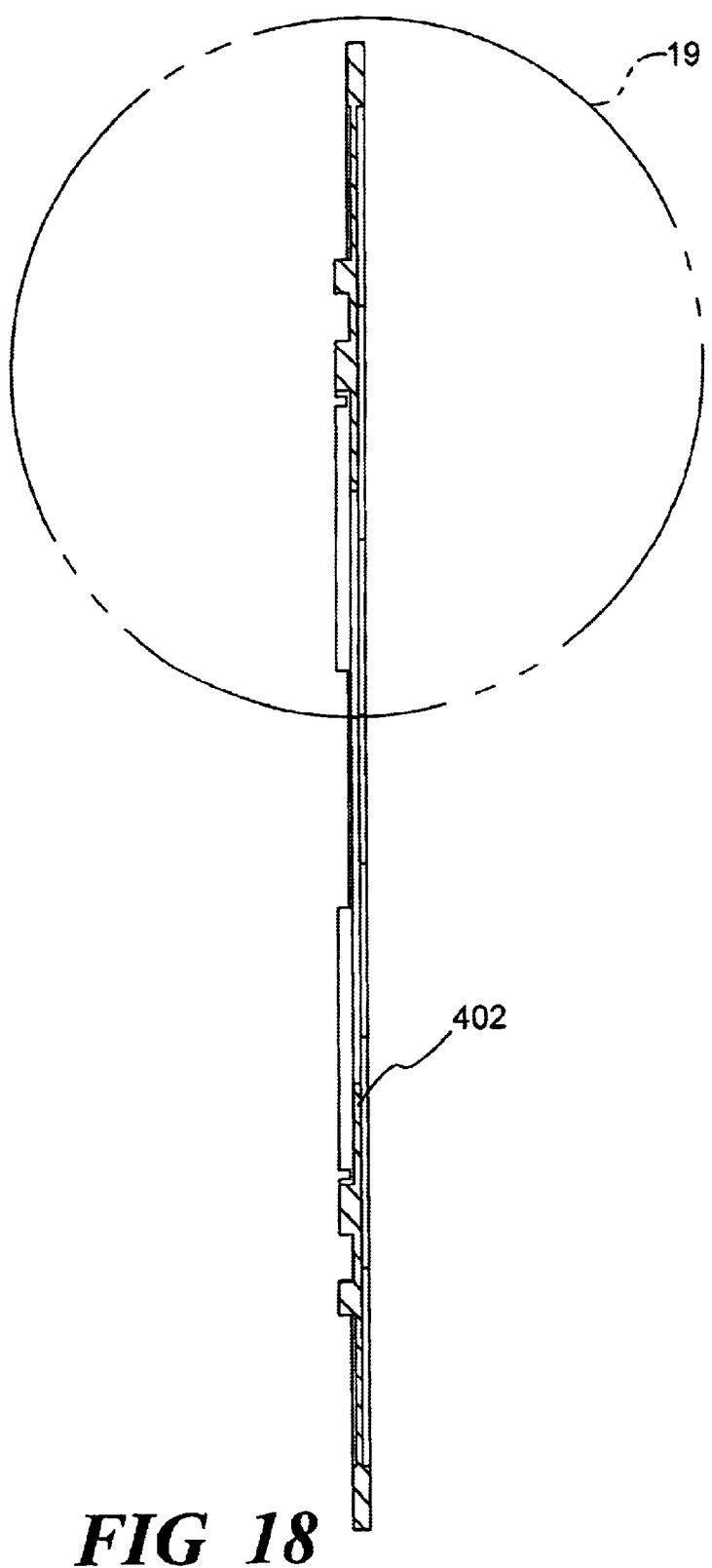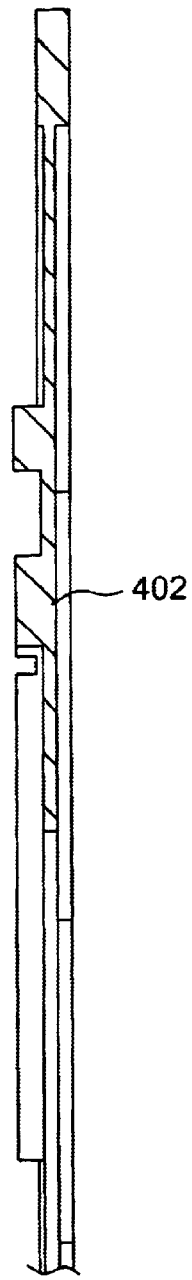
FIG 18  FIG 19

AXIAL GAP MOTOR-GENERATOR FOR HIGH SPEED OPERATION

RELATED APPLICATION

This application claims the benefit of priority of U.S. provisional application No. 60/156,746 filed in the U.S. Patent & Trademark Office on Sep. 30, 1999.

BACKGROUND OF THE INVENTION

1. Field of the Invention

The present invention relates to electrical generators and motors, and more specifically, to axial gap motor-generators and related components, systems and methods.

2. Description of the Related Art

A need has existed for some time for small, light weight and efficient electrical machines that are capable of handing substantial power outputs without the need for elaborate external cooling systems. Applications for such devices include power conversion systems or subsystems for satellites, military vehicles and weapon systems, and the like.

There has been a need for power conversion systems that can operate at high rotational speeds. There also has been a need for power conversion systems that generate relatively little heat. This feature can be important in applications such as space-based power systems, wherein heat dissipation can be quite limiting and thermal accumulation can degrade system performance and lifetime. Thermal generation also can be problematic with such applications as military weapon system power conversion subsystems. Excess thermal energy generated during power conversion, aside from constituting an unwanted loss of precious energy, can result in unwanted thermal signatures that can be utilized by hostile parties to identify and possibly target the platform. The generation of unwanted thermal energy also may be disadvantageous in that removal of such energy may require active cooling. This requirement can place unwanted demands on space, weight, power and energy resources.

Axial gap motor-generators have been used or proposed in some applications in which high power density and low thermal generation have been desired. Axial gap motor-generators offer a number of advantages over more traditional power conversion devices. Axial gap motor-generators can be advantageous when operated at high rotational rates, for example, in that they can provide high energy densities and relatively high power outputs while generating relatively little thermal energy loss.

Axial gap motor-generators, however, have not been without limitations. One such limitation is that, at the high rotational speeds often needed for sufficiently high power output levels, low heat loss levels, and low cooling requirements, for example, 10,000, and as high as 40,000 to 50,000 revolutions per minute (RPM), mechanical stresses are so substantial that failures are common. A number of approaches have been proposed for addressing such limitations.

One of the undesirable stresses placed on the system at high rotational speeds involves the substantial mechanical stress placed on the magnets used in the rotor. As the rotor spins at high speeds, the forces on the magnets are quite substantial. High efficiency magnets capable of generating the large magnetic field strengths required for high performance applications, such as neodymium-iron-boron magnets, are relatively brittle. Impact loading can cause them to crack and disintegrate at high rotational speeds. Their ability to accommodate tension forces is particularly limited.

Another limitation of axial gap motor-generators has been that, at the relatively high rotational speeds required for advanced power conversion systems, they have a limited ability to accommodate the structural deformations that occur as the device reaches its intended operational speed or speed range. Substantial flexure between the rotor and related components, for example, can change the geometry of the components responsible for converting power and the resultant magnetic field strength, thus causing inefficiencies and energy losses. Excessive flexure in some instances can result in unwanted contacting of moving components, which can result in destruction of the motor-generator.

Axial gap motor-generators also have been limited in that the performance of the magnets typically used in such machines is degraded substantially by elevated temperatures. The practical threshold for neodymium magnets and similar rare earth permanent magnets, for example, is about 120° C. Beyond that temperature range, their performance begins to degrade substantially and permanently. Thus, there is a need for axial gap motor-generators that have relatively contained operating temperatures so that the integrity and performance of the magnets can be preserved when the device operates at high speeds, e.g., in excess of 40,000 RPM.

A further limitation in many known axial gap motor-generators involves the presence of undesirable and problematic vibrations that arise in the device. These vibrations usually are attributable to the high speed rotation of the rotor assembly, and small asymmetries or variations in material densities, dimensions, etc.

OBJECTS OF THE INVENTION

Accordingly, an object of the present invention according to one aspect is to provide an axial gap motor-generator that is capable of operating effectively at high angular velocities, e.g., in excess of 10,000 RPM.

Another object of the invention according to another aspect is to provide an axial gap motor-generator that preserves the integrity of the magnets used in the device, even at relatively high rotational speeds.

Another object of the invention according to another aspect is to provide an axial gap motor-generator that can withstand substantial mechanical stress and deformation without significant adverse impact on the operation and efficiency of the device.

Another object of the invention according to a further aspect is to provide an axial gap motor-generator that effectively avoids undesirable thermal energy accumulation.

Another object of the invention according to still another aspect is to provide an axial gap motor-generator that limits unwanted vibrations in the device during high speed operation.

Another object of the invention is to provide related methods.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, an axial gap motor-generator is provided, of the type coupled to a shaft having an axis of rotation. The motor-generator comprises a rotor having a rotor body rotatably disposed about the shaft and having an outer region. The rotor includes a plurality of openings disposed in the outer region and spaced from one another. Each of the openings includes an outer edge, and preferably but optionally an inner edge and a pair of side edges. The motor-generator also includes a plurality of magnets equal in number to the openings. Each of the magnets includes an outer edge, and preferably but optionally an inner edge and a pair of side edges corresponding respectively to the inner edge, the outer edge, and the pair of side edges of a corresponding one of the openings. The outer edge of the magnets generally is non-conformal to and is slightly smaller than the outer edge of the corresponding one of the openings. Each of the magnets is shaped to be inserted into the corresponding one of the openings. A stator assembly is positioned adjacent to the rotor. The stator assembly includes windings positioned to be adjacent to the magnets when the rotor is rotated.

Preferably, the axial gap motor-generator according to this aspect of the invention further includes an expandable hub between the rotor and the shaft.

The rotor also may include a rim around the outer region. The rim may comprise, for example, a composite material.

The outer edge of each of the openings preferably has a first resting radius when the axial gap motor-generator is at rest, and the outer edge of each of the magnets has a second resting radius when the axial gap motor-generator is at rest, wherein the first resting radius is larger than the second resting radius. In the presently preferred embodiment according to this aspect of the invention, the second resting radius is about 80% of the first resting radius. Similarly, the outer edge of each of the openings preferably has a first operating radius when the axial gap motor-generator is at an operational speed, and the outer edge of each of the magnets has a second operating radius when the axial gap motor-generator is at the operational speed, wherein the first operational radius is substantially equal to the second operational radius.

Each of the magnets preferably is shaped relative to the corresponding one of the openings so that, when inserted into the corresponding one of the openings, the outer edge of the magnet and the outer edge of the corresponding one of the openings form an outer edge gap. In embodiments including the inner and side edges, the inner edge of the magnet and the inner edge of the opening form an inner edge gap, and each of the side edges of the magnet and the side edges of the corresponding one of the openings form a side edge gap.

Preferably, the axial gap motor-generator has an operational speed or operational speed range, and the outer edge of each of the magnets is dimensioned to conform or substantially conform to the outer edge of the corresponding one of the openings when the axial gap motor-generator is operated at the operational speed and the outer edge of the corresponding one of the openings is thereby deformed. In the preferred embodiment, a bonding material is disposed in a portion of the side edge gaps, but preferably is excluded from the inner and outer edge gaps.

The axial gap motor-generator preferably also includes a backiron assembly coupled to the rotor and rotatably mounted about the axis. The backiron assembly includes an attachment device rotatably disposed about the axis, and first and second couplers coupled to the attachment device. The first coupler is positioned on the first side of the rotor and the second coupler is positioned on the second side of the rotor. The backiron assembly also preferably includes first and second backiron plates disposed adjacent to but spaced from the windings of the stator assembly. The first backiron plate is coupled to the first coupler and is positioned on the first side of the rotor. The second backiron plate similarly is coupled to the second coupler and is positioned on the second side of the rotor. Each of the first and second couplers preferably comprises an annular tube. In the preferred embodiment, the attachment device is coupled to the rotor body. It may be threadably engaged with the rotor body.

In the preferred embodiment, the first rotor side is disposed in a first rotor plane and the second rotor side is disposed in a second rotor plane substantially parallel to the first rotor plane. In that embodiment, the first backiron plate is disposed in a first backiron plane and the second backiron plate is disposed in a second backiron plane. Preferably, the first and second backiron plates are disposed with respect to the first and second rotor planes when the rotor is at rest so that the first backiron plane is substantially parallel to the first rotor plane and the second backiron plane is substantially parallel to the second rotor plane when the axial gap motor is operated at the operational speed. Similarly, the first backiron plate preferably is disposed with respect to the first rotor plane when the rotor is at rest so that the first backiron plane forms an angle of about 1 to 3 degrees, and preferably about 2 degrees, with respect to the first rotor plane.

In like manner, in the preferred embodiment, the second rotor side is disposed in a second rotor plane; and the second backiron plate is disposed in a second backiron plane. In this embodiment, the second backiron plate is disposed with respect to the second rotor plane when the rotor is at rest so that the second backiron plane forms an angle of about 1 to 3 degrees, and preferably about 2 degrees, with respect to the second rotor plane. The first and second backiron plates preferably have a conical inclination toward the rotor.

In accordance with another aspect of the invention, an axial gap motor-generator is provided of the type coupled to a shaft having an axis of rotation. The motor-generator according to this aspect of the invention comprises magnetic field generating means for generating a magnetic field. The magnetic field generating means includes a force bearing means for bearing stress on the magnetic field generating means created when the axial gap motor-generator is operated at an operational speed. The motor-generator also includes rotor means for rotatably supporting the magnetic field generating means about the axis of rotation. The rotor means includes means for securing the magnetic field generating means to the rotor. The securing means includes means for conforming to the force bearing means when the axial gap motor-generator is operated at the operational speed. The motor-generator also includes stator means positioned adjacent to the magnetic field generating means for interacting with the magnetic field to generate an electric voltage.

Preferably but optionally, the rotor means further includes coupling means for coupling the rotor means to the shaft. The securing means preferably comprises means for bonding the magnetic field generating means to the rotor means. The bonding means preferably is excluded from the force bearing means.

The rotor means also preferably includes means for concentrating the magnetic field toward the stator means. The concentrating means includes means for aligning the concentrating means with the rotor means when the axial gap motor-generator is operated at the operational speed.

In accordance with another aspect of the invention, a rotor is provided for use in an axial gap motor-generator of the type coupled to a shaft having an axis of rotation. The rotor comprises a rotor body having an outer region. The rotor also includes a plurality of openings disposed in the outer region and spaced from one another. Each of the openings includes an outer edge, and preferably but optionally an inner edge and a pair of side edges. The rotor also includes a plurality of magnets equal in number to the openings. Each of the magnets includes an outer edge, and preferably but optionally an inner edge and a pair of side edges corresponding respectively to the outer edge, the inner edge, and the pair of side edges of a corresponding one of the openings. The outer edge of the magnets generally is non-conformal to and is slightly smaller than the outer edge of the openings. In embodiments including the inner edges and side edges, the inner edge of the magnets generally conforms to but is slightly smaller than the inner edge of the corresponding one of the openings, and the pair of side edges of the magnets generally conform to but are slightly smaller than the pair of side edges of the openings. Each of the magnets is shaped to be inserted into the corresponding one of the openings.

Preferably but optionally, the rotor further comprises an expandable hub for coupling the rotor to the shaft.

In the preferred embodiment of-the rotor according to this aspect of the invention, the outer edge of each of the openings has a first resting radius when the rotor is at rest. The outer edge of each of the magnets has a second resting radius when the rotor is at rest, wherein the first resting radius is larger than the second resting radius. The second resting radius in accordance with the preferred embodiments herein described is about 80% of the first resting radius.

The outer edge of each of the openings in the rotor preferably has a first operational radius when the rotor is at an operational speed. The outer edge of each of the magnets preferably has a second operational radius when the rotor is at the operational speed, wherein the first operational radius is substantially equal to the second operational radius.

Preferably, each of the magnets is shaped relative to the corresponding one of the openings so that, when inserted into the corresponding one of the openings, for embodiments including the inner and side edges, the inner edge of the magnet and the inner edge of the opening form an inner edge gap, each of the side edges of the magnet and the side edges of the corresponding one of the openings form a side edge gap, and the outer edge of the magnet and the outer edge of the corresponding one of the openings form an outer edge gap.

The rotor, like the motor-generator, has an operational speed or operational speed range. Preferably, the outer edge of each of the magnets is dimensioned to conform to the outer edge of the corresponding one of the openings when the rotor is operated at the operational speed and the outer edge of the corresponding one of the openings is thereby deformed.

In the preferred rotor, a bonding material is disposed in a portion of the side edge gaps. The bonding material preferably is excluded from the outer edge gap, and more preferably is excluded from the inner and outer edge gaps.

The rotor preferably includes a backiron assembly comprising an attachment device coupled to the rotor body and rotatably disposed about the axis, and first and second couplers coupled to the attachment collar. The first coupler is positioned on the first side of the rotor and the second coupler is positioned on the second side of the rotor. The backiron assembly further includes a first backiron plate coupled to the first coupler and positioned on the first side of the rotor, and a second backiron plate coupled to the second coupler and positioned on the second side of the rotor. Preferably, each of the first and second couplers comprises an annular tube. The attachment device preferably is coupled to the rotor body. Again, preferably, the attachment device is threadably engaged with the rotor body.

In the preferred embodiment, the first rotor side is disposed in a first rotor plane and the second rotor side is disposed in a second rotor plane substantially parallel to the first rotor plane. In this embodiment, the first backiron plate is disposed in a first backiron plane and the second backiron plate is disposed in a second backiron plane. The first and second backiron plates are disposed with respect to the first and second rotor planes when the rotor is at rest so that the first backiron plane is substantially parallel to the first rotor plane and the second backiron plane is substantially parallel to the second rotor plane when the rotor is operated at the operational speed.

Preferably, the first backiron plate is disposed in a first backiron plane, and the first backiron plate is disposed with respect to the first rotor plane when the rotor is at rest so that the first backiron plane forms an angle of about 1 to 3 degrees, and more preferably about 2 degrees, with respect to the first rotor plane. Similarly, preferably the second rotor side is disposed in a second rotor plane, the second backiron plate is disposed in a second backiron plane, and the second backiron plate is disposed with respect to the second rotor plane when the rotor is at rest so that the second backiron plane forms an angle of about 1 to 3 degrees, and more preferably about 2 degrees, with respect to the second rotor plane.

In accordance with another aspect of the invention, a rotor is provided for use in an axial gap motor-generator of the type coupled to a shaft having an axis of rotation. The rotor according to this aspect of the invention comprises magnetic field generating means for generating a magnetic field. The magnetic field generating means includes a force bearing means for bearing stress on the magnetic field generating means created when the axial gap motor-generator is operated at an operational speed. The rotor also includes means for securing the magnetic field generating means to the rotor. The securing means includes means for conforming to the force bearing means when the axial gap motor-generator is operated at the operational speed.

Preferably, the rotor includes coupling means for coupling the rotor to the shaft. The securing means preferably comprises means for bonding the magnetic field generating means to the rotor means. Preferably, where a bonding means is used, it is excluded from the force bearing means. The rotor preferably also includes means for concentrating the magnetic field toward the stator means. The concentrating means includes means for aligning the concentrating means with the rotor means when the axial gap motor-generator is operated at the operational speed.

In accordance with another aspect of the invention, a magnet is provided for use in a rotor of an axial gap motor-generator of a type coupled to a shaft having an axis of rotation. The rotor includes a plurality of openings, each of the openings including an outer edge. The magnet according to this aspect of the invention comprises an outer edge corresponding to the outer edge of a corresponding one of the openings. The outer edge of the magnet generally is non-conformal to and is slightly smaller than the outer edge of the openings. The magnet is shaped to be inserted into and to substantially conform to a corresponding one of the openings. The magnet is shaped relative to the corresponding one of the openings so that, when inserted into the corresponding one of the openings, the outer edge of the magnet is non-conformal with the outer edge of the opening when the rotor is in a rest state, and the outer edge of the magnet is conformal with or substantially conformal with the outer edge of the opening when the rotor is in an operational state.

In accordance with another aspect of the invention, a backiron assembly is provided for use in an axial gap motor-generator of a type coupled to a shaft having an axis of rotation and having a rotor with first and second sides. The backiron assembly comprises an attachment device disposed about a backiron assembly axis corresponding to the axis of rotation. The backiron assembly also includes first and second couplers coupled to the attachment device. The first coupler is positioned on the first side of the rotor and the second coupler is positioned on the second side of the rotor when the backiron assembly is operated with the rotor. The backiron assembly further includes first and second backiron plates coupled to the first and second couplers respectively and are positioned on the first and second sides respectively of the rotor when the backiron assembly is operated with the rotor.

Each of the first and second couplers preferably comprises an annular tube. In the preferred embodiment according to this aspect of the invention, the attachment device is threaded for engagement with the rotor.

The backiron assembly is designed to operate at an operational speed. In the preferred embodiment, the first rotor side is disposed in a first rotor plane and the second rotor side is disposed in a second rotor plane substantially parallel to the first rotor plane. In this embodiment, the first backiron plate is disposed in a first backiron plane and the second backiron plate is disposed in a second backiron plane, and the first and second backiron plates is disposed with respect to the first and second rotor planes when the backiron assembly is operated with the rotor and the rotor is at rest so that the first backiron plane is substantially parallel to the first rotor plane and the second backiron plane is substantially parallel to the second rotor plane when the backiron assembly is operated at the operational speed.

Preferably, the first backiron plate is disposed in a first backiron plane, and the first backiron plate is disposed with respect to the first rotor plane when the backiron assembly is operated with the rotor and the rotor is at rest so that the first backiron plane forms an angle of about 1 to 3 degrees, and more preferably about 2 degrees, with respect to the first rotor plane. Similarly, the second backiron plate is disposed in a second backiron plane, and the second backiron plate is disposed with respect to the second rotor plane when the backiron assembly is operated with the rotor and the rotor is at rest so that the second backiron plane forms an angle of about 1 to 3 degrees, and more preferably about 2 degrees, with respect to the second rotor plane. The first and second backiron plates preferably have a conical inclination toward the rotor when the backiron assembly is coupled to the rotor and the backiron assembly is at rest.

In accordance with another aspect of the invention, a backiron assembly is provided for use in an axial gap motor-generator of a type coupled to a shaft having an axis of rotation having a rotor with first and second sides and a stator assembly. The backiron assembly comprises attachment means disposed about a backiron assembly axis corresponding to the axis of rotation for attaching the backiron assembly to the rotor, first and second magnetic field concentrating means positioned on the first and second sides respectively of the rotor when the backiron assembly is operated with the rotor for concentrating a magnetic field from the rotor to the stator assembly, and first and second coupling means for coupling the respective first and second magnetic field concentrating means to the attachment means.

In accordance with another aspect of the invention, an apparatus is provided for coupling a shaft and bearing assembly to a housing. The apparatus comprises an inner sleeve for coupling to the shaft and bearing assembly. The inner sleeve has an exterior surface and a pair of longitudinal edges. Each of the longitudinal edges includes a plurality of stanchions. The apparatus also includes an outer sleeve for coupling to the housing. The outer sleeve has an interior surface and a pair of longitudinal edges. Each of the outer sleeve longitudinal edges includes a plurality of outer sleeve stanchions corresponding in number and location to the inner sleeve stanchions and thereby forming a plurality of stanchion pairs. The inner sleeve is disposed within the outer sleeve to form an annular cavity between the exterior surface of the inner sleeve and the interior surface of the outer sleeve. The apparatus further includes a vibration absorbing material disposed in the annular cavity. The vibration absorbing material may assume a variety of different forms, as disclosed in greater detail below. The apparatus also includes a plurality of couplers. Each of the couplers corresponds to one of the stanchion pairs. Each of the couplers couples the corresponding stanchion pair together. In the preferred embodiment according to this aspect of the invention, each of the couplers comprises a C flexure.

In accordance with another aspect of the invention, an apparatus is provided for coupling a shaft and bearing assembly to a housing. The apparatus comprises outer sleeve means for coupling to the housing, and inner sleeve means disposed annularly within the outer sleeve means for coupling to the shaft and bearing assembly. The outer and inner sleeve means form an annular gap. The annular gap comprises vibration absorbing means for absorbing vibrations between the outer and inner sleeve means. The outer and inner sleeve means include coupling means for coupling the outer and inner sleeves to one another. The coupling means comprises stanchion means and fastening means for fastening the stanchion means to one another.

In accordance with another aspect of the invention, a method is provided for securing a magnet in a rotor having an opening with an outer edge, wherein the outer edge of the opening has a deformed shape when the rotor is in an operational state. The method comprises providing the magnet with an outer edge corresponding to the outer edge of the opening and sized to fit within the opening, and shaping and dimensioning the outer edge of the magnet so that the outer edge of the magnet substantially conforms to the outer edge of the opening when the outer edge of the opening has the deformed shape. The method optionally but preferably includes excluding a bonding material from the outer edge of the magnet.

In accordance with yet another aspect of the invention, a method is provided for rotating a rotor about an axis of rotation. The method comprises providing the rotor with a rotor body having an outer region and a plurality of openings disposed in the outer region and spaced from one another. Each of the openings includes an outer edge.

The method also includes disposing a magnet into each of the openings. Each magnet includes an outer edge corresponding to the outer edge of the openings. The outer edge of the magnets generally is non-conformal to and is slightly smaller than the outer edge of the openings. Each of the magnets is shaped to be inserted into a corresponding one of the openings.

The method further includes rotating the rotor to an operational speed so that the outer edge of the openings deform to thereby conform to the shape of the outer edge of the magnets.

Preferably, the opening providing step of the method includes shaping the outer edge of each of the openings to conform to a first resting radius when the rotor is at rest, and the magnet providing step includes shaping the outer edge of each of the magnets to conform to a second resting radius when the rotor is at rest, wherein the first resting radius is smaller than the second resting radius. Preferably but optionally, the second resting radius is about 80% of the first resting radius. Also preferably but optionally, the opening providing step includes shaping the outer edge of each of the openings to conform to a first operational radius when the rotor is at an operational speed, and the magnet providing step includes shaping the outer edge of the magnets to conform to a second operational radius when the rotor is at the operational speed, wherein the first operational radius is substantially equal to the second operational radius.

In accordance with another aspect of the invention, a method is provided for rotating a rotor having first and second rotor sides and a backiron assembly having first and second backiron plates. The method comprises positioning the first and second backiron plates at an angle with respect to the respective first and second rotor sides when the rotor and backiron are at rest. Preferably, the angle is about 1 to 3 degrees, and more preferably about 2 degrees. Also preferably, the angle is selected so that the first and second backiron plates are substantially parallel with respect to the respective first and second rotor sides when the rotor and backiron plates are rotating at an operational speed.

In accordance with still another aspect of the invention, a system is provided for converting power. The system comprises a shaft assembly, a flywheel coupled to the shaft assembly (optionally a plurality of such flywheels, and preferably two), and an axial gap motor-generator coupled to a shaft having an axis of rotation. The motor-generator preferably comprises an axial gap motor-generator as described above.

BRIEF DESCRIPTION OF THE DRAWINGS

The accompanying drawings, which are incorporated in and constitute a part of the specification, illustrate a presently preferred embodiments and methods of the invention and, together with the general description given above and the detailed description of the preferred embodiments and methods given below, serve to explain the principles of the invention.

FIG. 9 shows the arrangement of the magnets in the rotor assembly;

FIG. 10 shows an enlarged view of an illustrative one of the openings and magnets in the rotor assembly of FIGS. 4–7, corresponding to the circle 10 in FIG. 6, when the rotor is at rest;

FIG. 11 shows an enlarged view of the opening and magnet shown in FIG. 10, but wherein the rotor is in an operational state;

FIG. 15 shows a side cutaway view of the backiron plate and coupler of FIG. 14;

FIG. 16 illustrates the orientation of the backiron plate of FIGS. 14 and 15 to the rotor planes;

FIG. 18 shows a side cutaway view of the stator assembly shown in FIG. 17, taken along lines 18—18 of FIG. 17;

FIG. 19 shows a side cutaway view of a portion of the stator assembly of FIGS. 17 and 18, corresponding to circle 19 in FIG. 18;

DETAILED DESCRIPTION OF THE PREFERRED EMBODIMENTS AND METHODS

Figure 1:
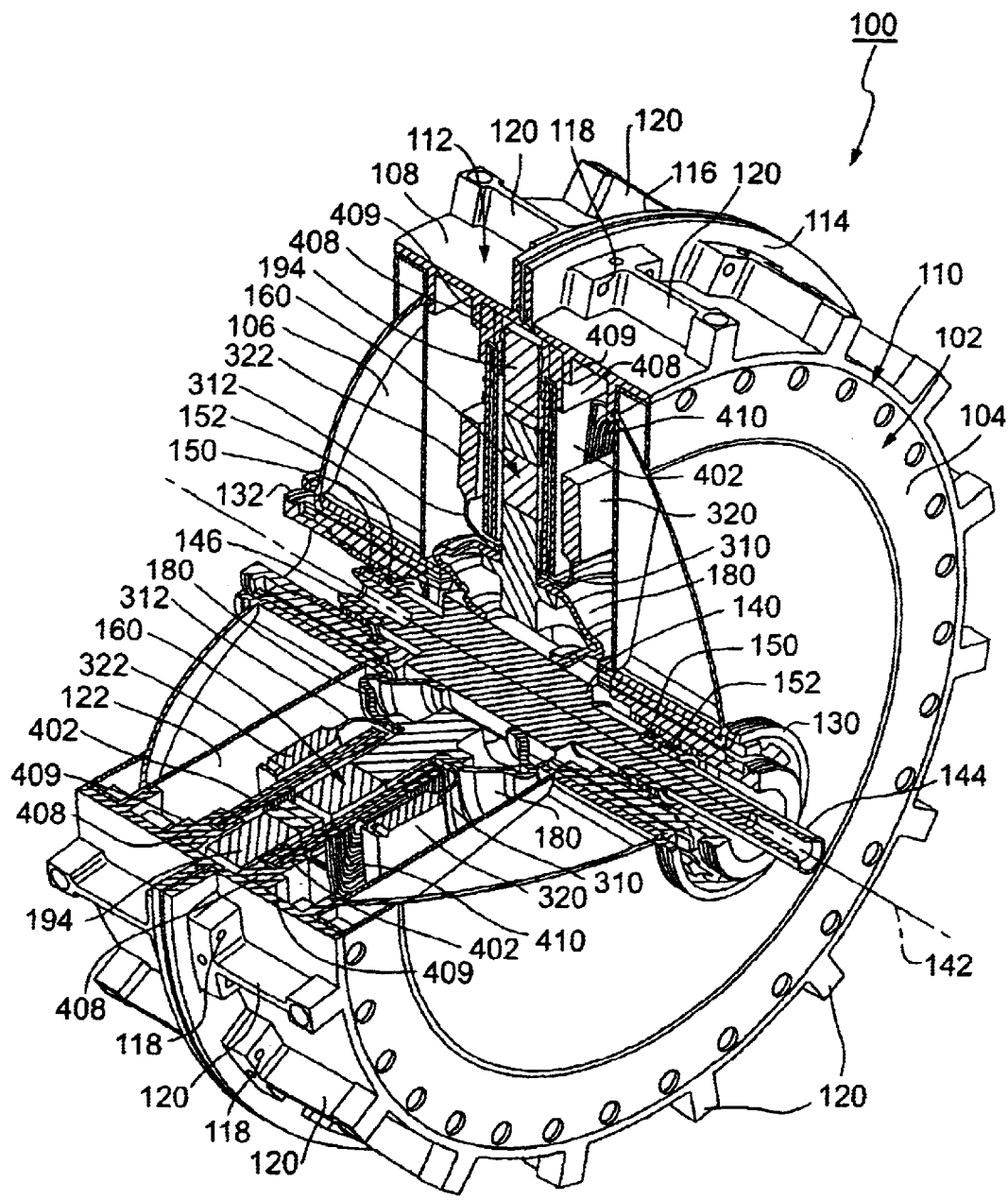
FIG. 1 is a perspective, partial cutaway drawing of an axial gap motor-generator according to a presently preferred embodiment of the invention.
Figure 2:
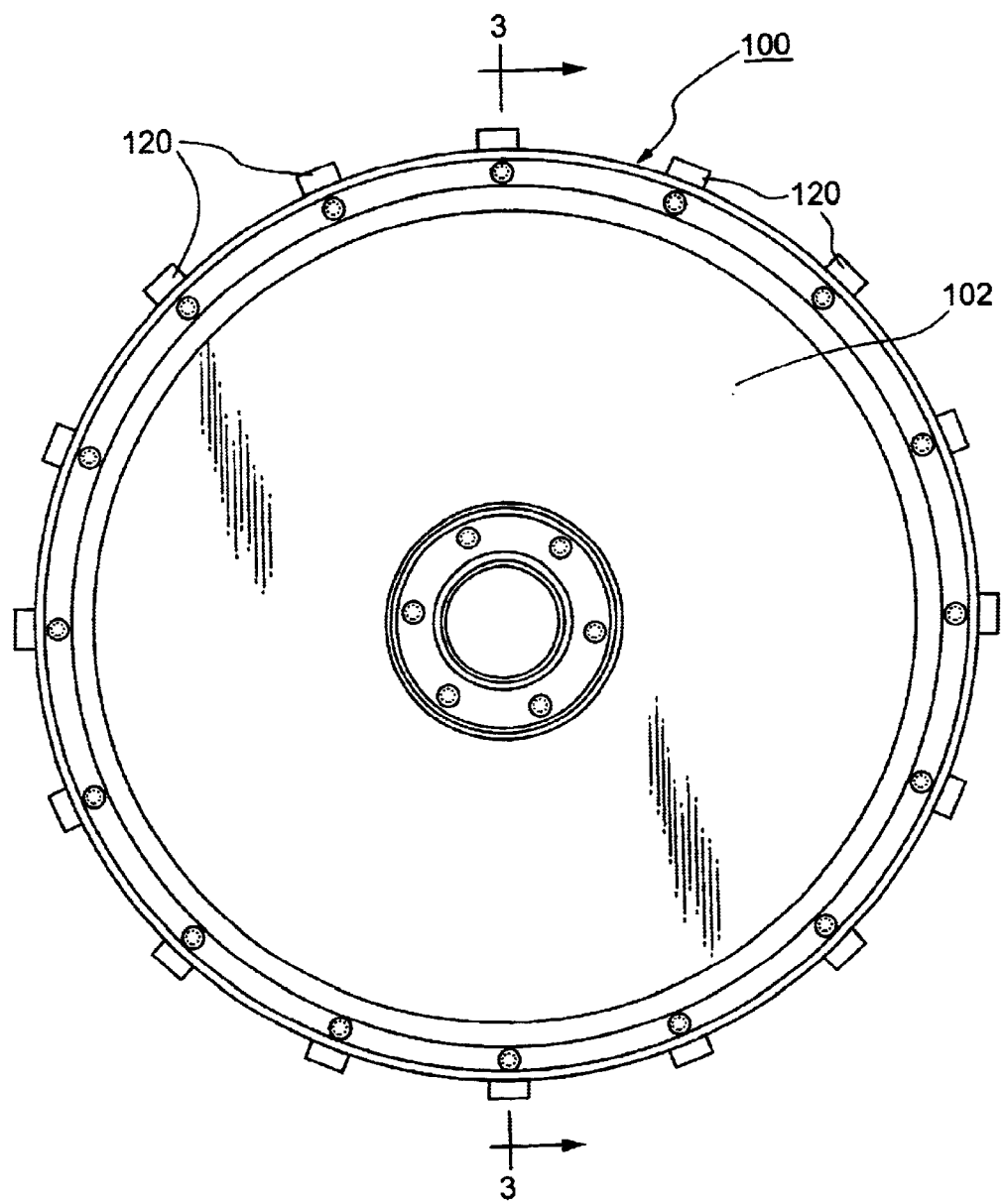
FIG. 2 shows an axial view of the motor-generator shown in FIG. 1.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods.

The invention according to its various aspects is particularly pointed out and distinctly claimed in the attached claims read in view of this specification, and appropriate equivalents.

In accordance with one aspect of the invention, an axial gap motor-generator is provided. The axial gap motor-generator is of the type coupled to a shaft having an axis of rotation. The motor-generator may be used, for example, as a component in such applications as aerospace main power and auxiliary power units, satellite power systems, military and commercial vehicle power systems, weapon system power supplies, and the like. It is useful as a power conversion system in these and other applications that require conversion of power from mechanical to electrical and/or vice versa.

An axial gap motor-generator 100 according to a presently preferred embodiment of this aspect of the invention is shown in FIG. 1. Axial gap motor-generator 100 is contained within a housing 102 having a first side face 104, a second side face 106, and a substantially cylindrical wall 108. Housing 102 in this embodiment is comprised of two mating housing shells 110 and 112, preferably constructed of a high grade aluminum. Housing shell 110 is comprised of first side face 104 and about half of cylindrical wall 108. A mating flange 114 is disposed on the cylindrical wall portion 108 of housing shell 110 at its periphery. Housing shell 112 similarly is comprised of second side face 106 and about one half of cylindrical wall 108. Housing shell 112 also includes a mating flange 116 on cylindrical wall portion 108 at its periphery. Flanges 114 and 116 mate to one another when housing shells 110 and 112 are aligned and mated. Mating flanges 114 and 116 are secured to one another by a plurality of bolts 118. When housing shells 110 and 112 are mated together and housing 102 is in its operational form, housing 102 forms an hermetically sealed and substantially air-tight cavity. A plurality of exterior ribs 120 are disposed on the exterior of cylindrical wall 108 of housing shells 110 and 112. A plurality of interior ribs 122 are disposed on the interior walls of housing faces 104 and 106.

Housing shell 110 includes a bearing seat or race 130 substantially at the axial center of face 104, and housing shell 112 includes a bearing seat or race 132 substantially at the axial center of face 106.

Axial gap motor-generator 100 according to this preferred but merely illustrative embodiment is coupled to a shaft 140 passing through housing 102. Shaft 140 is disposed along a longitudinal axis 142. Reference is made herein to a radial dimension for purposes of illustration. The radial dimension refers to vectors or radii lying in planes perpendicular to longitudinal axis 142. Shaft 140 has first and second ends 144 and 146, respectively. A mechanical drive source (not shown) may be and preferably is operatively coupled to end 144 of shaft 140.

Shaft 140 is coupled to housing 102 using a pair of bearings 150 and 152 at each end of shaft 140. Each of bearings 150 and 152 in this embodiment comprises a set of mechanical bearings, including, for example, ceramic or silicon nitride ball bearings, housed in bearing races, journals or hubs 130 and 132. Bearings 150 and 152 are appropriately lubricated for operation at the desired speed range and operating conditions.

The bearing arrangement shown and described here is not necessarily limiting, and other designs for rotatably mounting shaft 140 to housing 102 are possible. Where the application warrants, for example, shaft 140 may instead be rotatably mounted to housing 102 using a low-loss airfoil or magnetic bearings. An illustrative example of the use of such magnetic bearings will be discussed below.

The size of these components will vary depending upon the application. In the preferred but merely illustrative embodiment shown in the drawing figures, housing 102 has an outside diameter of about one foot, and an axial length at its exterior of about 7 inches.

In accordance with another aspect of the invention, a rotor is provided for use in an axial gap motor-generator of the type coupled to a shaft having an axis of rotation. In accordance with a related aspect of the invention, a rotor means is provided for rotatably supporting a magnetic field generating means (described below) about the axis of rotation. The motor-generator according to the invention, and for which motor-generator 100 is a preferred embodiment, similarly includes a rotor or rotor means.

To illustrate, and as specifically implemented in the preferred embodiment, motor-generator 100 includes a rotor means comprising a rotor 160 coupled to shaft 140 to rotate within housing 102 about axis 142. Rotor 160 is shown individually (with shaft 140) in FIGS. 4–7. Rotor 160 includes first and second sides 162 and 164 and a peripheral edge 166. Rotor 160 also includes a rotor body 168 which in turn includes an outer region or portion 170. Rotor body 168, which in this embodiment is comprised of titanium, has a substantially disk-shaped profile, with rotor side 162 on one side of the disk and rotor side 164 on the other. Rotor 160 lies substantially in a rotor plane 172 extending radially and passing through the center of the disk-shaped portion of rotor body 168. More specifically, for reference purposes, first side 162 of rotor 160 lies substantially in a first rotor plane 172 and second side 164 of rotor 160 lies substantially in a second rotor plane 174, wherein the first and second rotor planes are parallel to one another as well as being parallel to rotor plane 172, and rotor plane 172 lies between first and second rotor planes 172 and 174. First and second rotor planes 172 and 174 thus are spaced from one another by the thickness between first and second rotor sides 162 and 164.

Rotor 160 in the presently preferred embodiment is attached to shaft 140 by a coupling means, preferably comprising a hub. In accordance with this aspect of the invention, an expandable hub 180 may be provided as the coupling means between the rotor and the shaft for mechanically coupling rotor 160 to shaft 140. Hub 180 according to this embodiment is designed as disclosed in U.S. Pat. No. 6,014,911, issued on Jan. 18, 2000 and assigned to Optimal Energy Systems, Inc. of Torrance, Calif. Specifically, hub 180 comprises a two-piece shell formed by joining a pair of steel hub halves 182 and 184, e.g., by shrink-fit on rotor body 168. The interior of the shell is void, and thus forms a cavity 186. Hub halves 182 and 184 may be fabricated by machining each half separately, aligning them, and then shrink-fit. Rotor body 168 is coupled to the outer portion of hub 180, i.e., at a hub-rotor body intersection or attachment site 188 by extending a base and flange portion 190 of rotor body 168 into cavity 186 through a hub port 192.

A composite ring 194 in this embodiment is disposed around the titanium rotor body 168 adjacent to outer region 170, i.e., at a composite ring-rotor body intersection or attachment site 196. Composite ring 194 comprises a filament-wound composite of graphite fiber and appropriate matrix material. It is bonded to the peripheral edge 166 of rotor body 168, preferably using an epoxy-based adhesive. Composite ring 194 preferably is applied to rotor body 168 so that it is stress free, and thus exerts no radial force on rotor body 168. This ring, which is an optional component, can provide mechanical support, e.g., to restrain the titanium rotor from unduly stressing and distorting under the rotational forces generated at high-speed operation. In this preferred but illustrative embodiment, composite ring 194 has essentially the same width as the adjacent portions of rotor body 168 at peripheral edge 166, and is approximately ½ inch thick radially.

A pair of mounting holes 198 also is provided in rotor body 168 to facilitate removal of the backiron (described below) from motor-generator 100 and to mount it, for example, when being serviced or repaired.

The rotor means according to this aspect of the invention includes means for securing the magnetic field generating means to the rotor. The securing means preferably includes a plurality of openings disposed in the outer region. The "outer region" of rotor 160 incidentally is specifically used herein to refer to the portion of the rotor at which the openings and the magnetic field generating means (e.g., magnets as described below) contained within them are located. The openings are spaced from one another along the outer region. Each of the openings includes an outer edge. Optionally but preferably, each opening also includes an inner edge and a pair of side edges. Each opening preferably passes substantially through the rotor, and more preferably completely through it, in an axial direction. In presently preferred embodiments, the inner and outer edges of the openings lie on concentric arcs in general alignment with the outer radius of the rotor. The side edges preferably are disposed along radii extending outwardly from the axis of the shaft.

Figure 6:
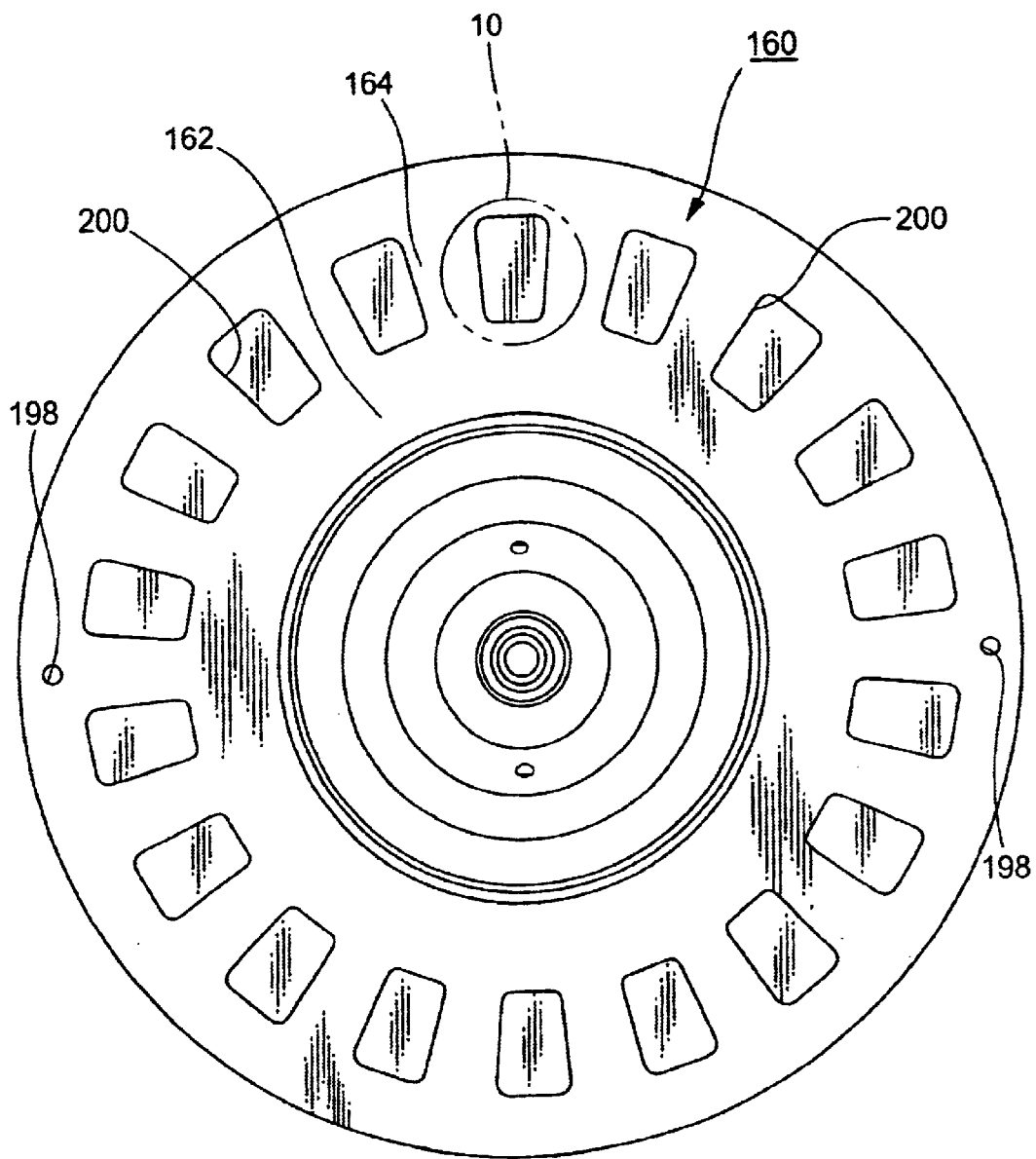
FIG. 6 shows an axial view of the rotor body of the rotor assembly shown in FIG. 4, wherein the backiron assembly has been removed.
Figure 7:
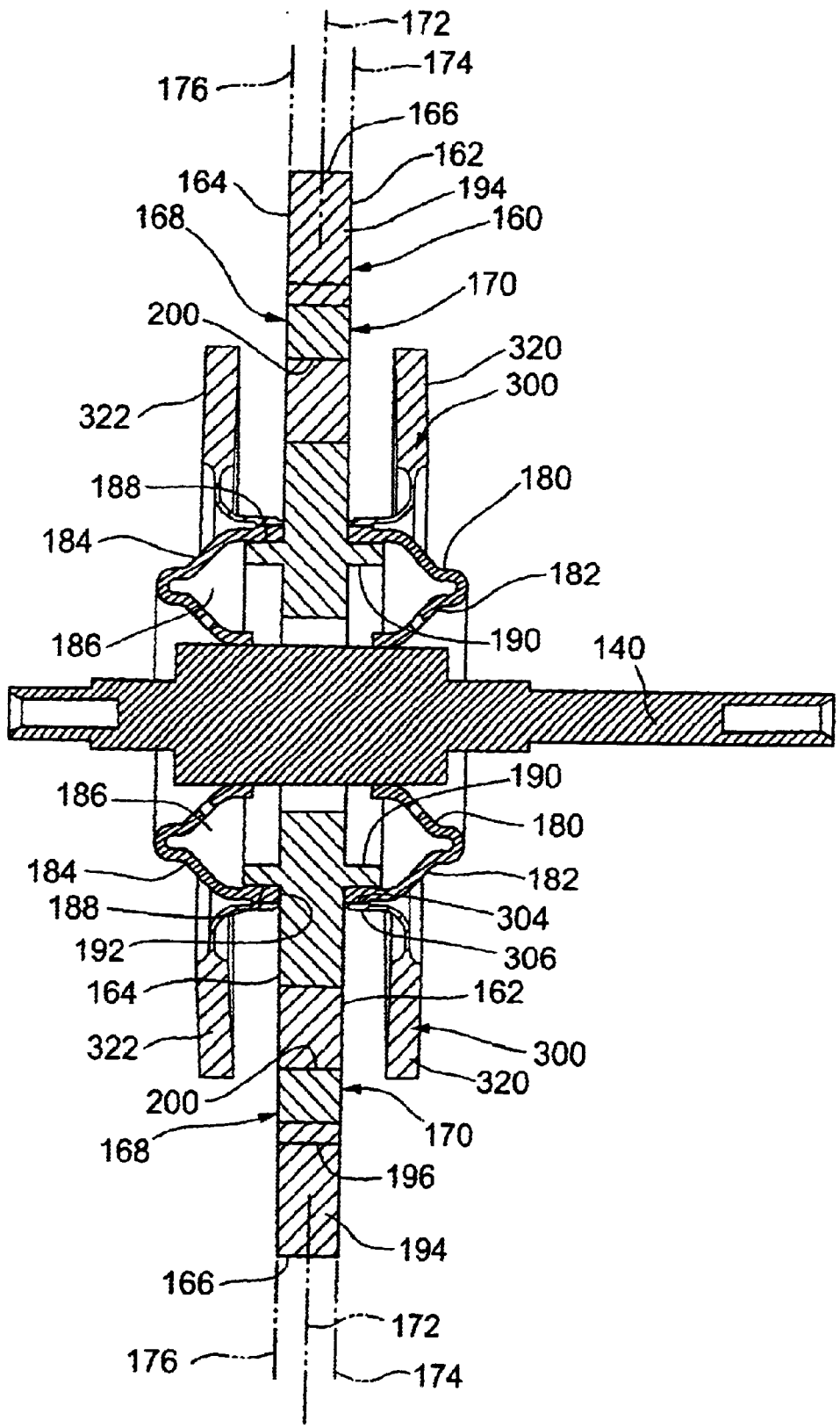
FIG. 7 provides a side cutaway view of the rotor assembly shown in FIGS. 4–7.
Figure 8:
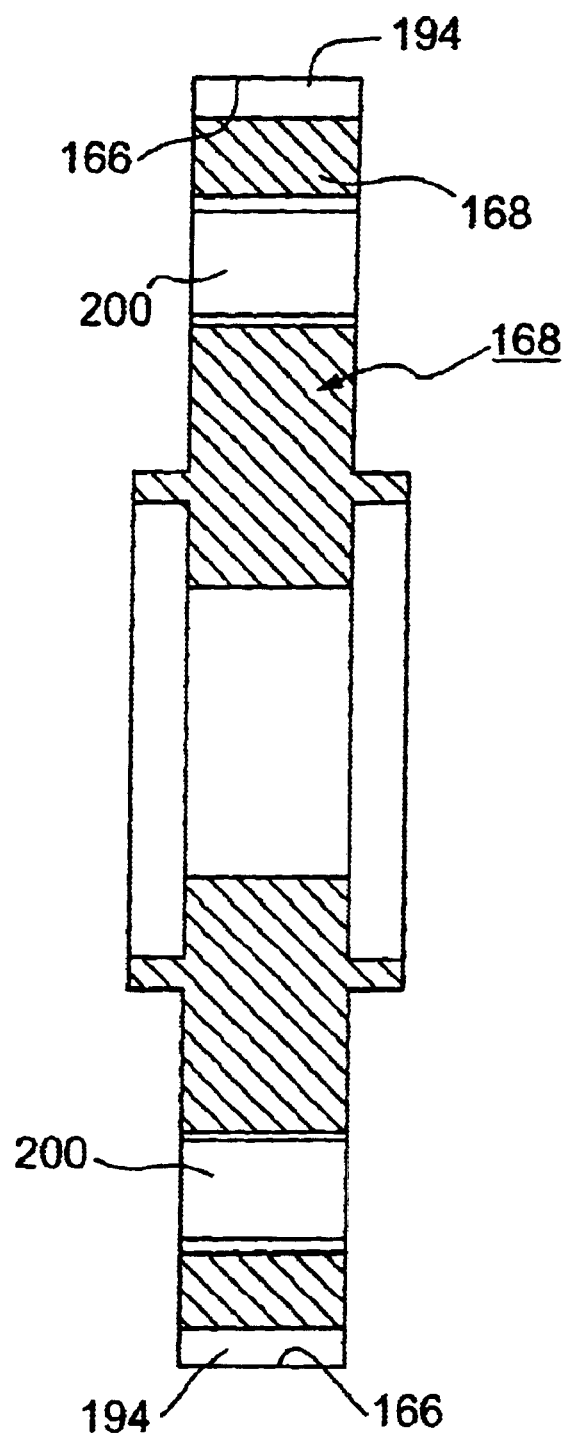
FIG. 8 shows a side cutaway view of the rotor body for the rotor assembly of FIGS. 4–8.

As implemented in the presently preferred but merely illustrative embodiment shown and described herein, rotor 160 of axial gap motor-generator 100 includes securing means which comprise a plurality of openings 200 disposed in its outer region 170 (see, e.g., FIG. 6). Openings 200 are spaced from one another along the periphery of outer region 170. Each of the openings 200 includes an inner edge 202, an outer edge 204, and a pair of side edges 206 and 208. Each opening passes through rotor 160 in an axial direction. Outer edge 204 for each of the openings 200 has a slightly bowed shape, which preferably comprises a constant radius single curve in the center portion that transitions to straight side edges via a constant radius singly curved transition in the outer corners. Inner edges 202 of each of the openings 200 preferably comprise a constant radius single curve at the center portion, the radius being of smaller dimension than that of the center portion of outer edge 204, and transitions to the straight edges via constant radius singly curved transitions in the inner corners. The straight portions of the side edges preferably are radially aligned. Each of the openings in this embodiment passes completely through the rotor body axially.

In accordance with another aspect of the invention, a magnet is provided for use in a rotor of an axial gap motor-generator of a type coupled to a shaft having an axis of rotation. The motor-generator according to the aspect of the invention heretofore described and the inventive rotor design also include magnetic field generating means for generating a magnetic field. The magnetic field generating means preferably comprise a plurality of such magnets, optionally but preferably equal in number to the openings. Each of the magnets is shaped to be inserted into and to substantially conform to a corresponding one of the openings. Each of the magnets includes an outer edge corresponding to the outer edge of a corresponding one of the openings. Each of the magnets also may and preferably does include an inner edge and a pair of side edges corresponding respectively to the inner edge and side edges of the corresponding one of the openings. The outer edges of the magnets generally are non-conformal to, and are slightly smaller than, the outer edge of the opening. Where present, the inner edge of the magnets preferably generally conform to but are slightly smaller than the inner edge of the corresponding one of the openings, and the pair of side edges of the magnets preferably generally conform to, but are slightly smaller than the pair of side edges of the openings.

In accordance with a related aspect of the invention, a method is providing for securing a magnet in a rotor having an opening with an outer edge, wherein the outer edge of the opening has a deformed shape when the rotor is in an operational state. The method comprises providing the magnet with an outer edge corresponding to the outer edge of the opening and sized to fit within the opening. The method further includes shaping and dimensioning the outer edge of the magnet so that the outer edge of the magnet substantially conforms to the outer edge of the opening when the opening is in the deformed state and the outer edge of the opening has the deformed shape. The deformed shape may be, or may be approximated by, a radius, which is referred to herein as a first operational radius.

As noted above, during rotation of the rotor under normal operating conditions of the motor-generator and at approximately normal operating speed, the openings in the rotor are deformed. This deformation is most pronounced at the outer edges of the openings. The magnets under these operating conditions typically do not deform in the same manner or to the same extent. This changes the relative geometries at the magnet-opening interface at the outer edge. If the outer edge of the magnet is designed such that, when at rest and thus in a non-operational state, it conforms to the outer edge of the opening, this deformation of the opening changes the forces and stresses on the magnet.

In accordance with this aspect of the invention, this concern can be successfully addressed by shaping the magnets, and particularly the outer edges of the magnets, so that, at the operational speed and under normal operating conditions, the outer edges of the magnets and the outer edges of the corresponding openings conform to one another. Because the magnets typically are not very resilient under tensile stresses, e.g., given their brittleness, one approach involves shaping and dimensioning the magnets so that they will conform to the deformed opening at operational speed. Conversely, if the shape of the magnets is controlled or given, one may adjust the shape of the opening so that the outer edges of the openings and the magnets conform under operating conditions. As a general matter, the relative shapes of the outer edges of the magnets and the openings should substantially conform under operational conditions and at operational speeds. This may and typically will result in a non-conformance of the outer edges when the device is at rest and not under these operational conditions.

In this manner, the outer edge of the magnets according to the aspect of the invention may be considered to comprise a force bearing means for bearing and distributing the forces exerted on the magnet during operation, and the outer edge of the openings may considered a means for conforming to this force bearing means when the motor-generator is operated at the operational speed As implemented in the presently preferred embodiment and methods according to these aspects of the invention, a magnetic field generating means which comprises a plurality of magnets 220 equal in number to openings 200 is provided in axial gap motor-generator 100, for example, as shown in FIGS. 3, 4, 6 and 7. The magnets preferably are positioned in the rotor with the poles arranged as shown in FIG. 9.

Magnets 220 may comprise any one of a range of specific magnet types and compositions. Preferred examples include samarium-cobalt, neodymium-iron-boron, and/or rare-earth based materials.

Each of the magnets 220 is shaped to be inserted into and to substantially conform to a corresponding one of the openings 200. As shown in FIG. 10, for example, each of the magnets 220 preferably includes an inner edge 222, an outer edge 224, and a pair of side edges 226 and 228 corresponding respectively to inner edge 202, outer edge 204, and the pair of side edges 206 and 208 of openings 200. Outer edge 224 of magnet 220 includes a center point 225. At rest, inner edge 222 of each of the magnets generally conforms to but is slightly smaller than inner edge 202 of openings 200. Also at rest, outer edges 224 of magnets 220 generally are non-conformal to, and are slightly smaller than, outer edges 204 of openings 200. The pair of side edges 226 and 228 of the magnets 220 at rest generally conform to but are slightly smaller than the pair of side edges 206 and 208 of the openings.

Each of the magnets 220 is shaped relative to the corresponding one of the openings 200 so that, when inserted into the corresponding one of the openings at rest, the inner edge 222 of the magnet and the inner edge 202 of the opening form an inner edge gap 232, preferably but optionally having a spacing of about 0.01 inches. The outer edges 224 of magnets 220 and outer the edges 204 of openings 200 form an outer edge gap 234, at least over a portion of outer edge 224, when at rest. Similarly, each of the side edges 226 and 228 of the magnets 220 and the corresponding side edges 206 and 208 of the corresponding one of the openings form side edge gaps 236 and 238, e.g., of about 0.01 inches, when at rest.

The outermost nonconforming surface at 224 of each of the plurality of magnets 220 preferably is dimensioned so that the outermost edge of the openings 200 at 204, e.g., the means for conforming to the force bearing means of the magnets, will tend to deform to this contour 224 of the magnet at some predetermined speed, preferably the designed operating speed of the motor-generator. As shown in FIG. 11, for example, which shows an opening 200 and contained magnet 220 under operational conditions and at an operating speed, outer edge 204 of opening 200 is in a deformed state 246 (FIG. 10). In the deformed state, outer edge 204 has become more curved, i.e., it substantially conforms to a smaller radius, than when at rest. In this deformed state 246, outer edge 204 of openings 200 substantially conforms to outer edge 224 of magnets 220. This can provide the highly beneficial result of reducing or eliminating force asymmetries and stress concentrations in the magnets, as noted above.

Figures 12, 13:
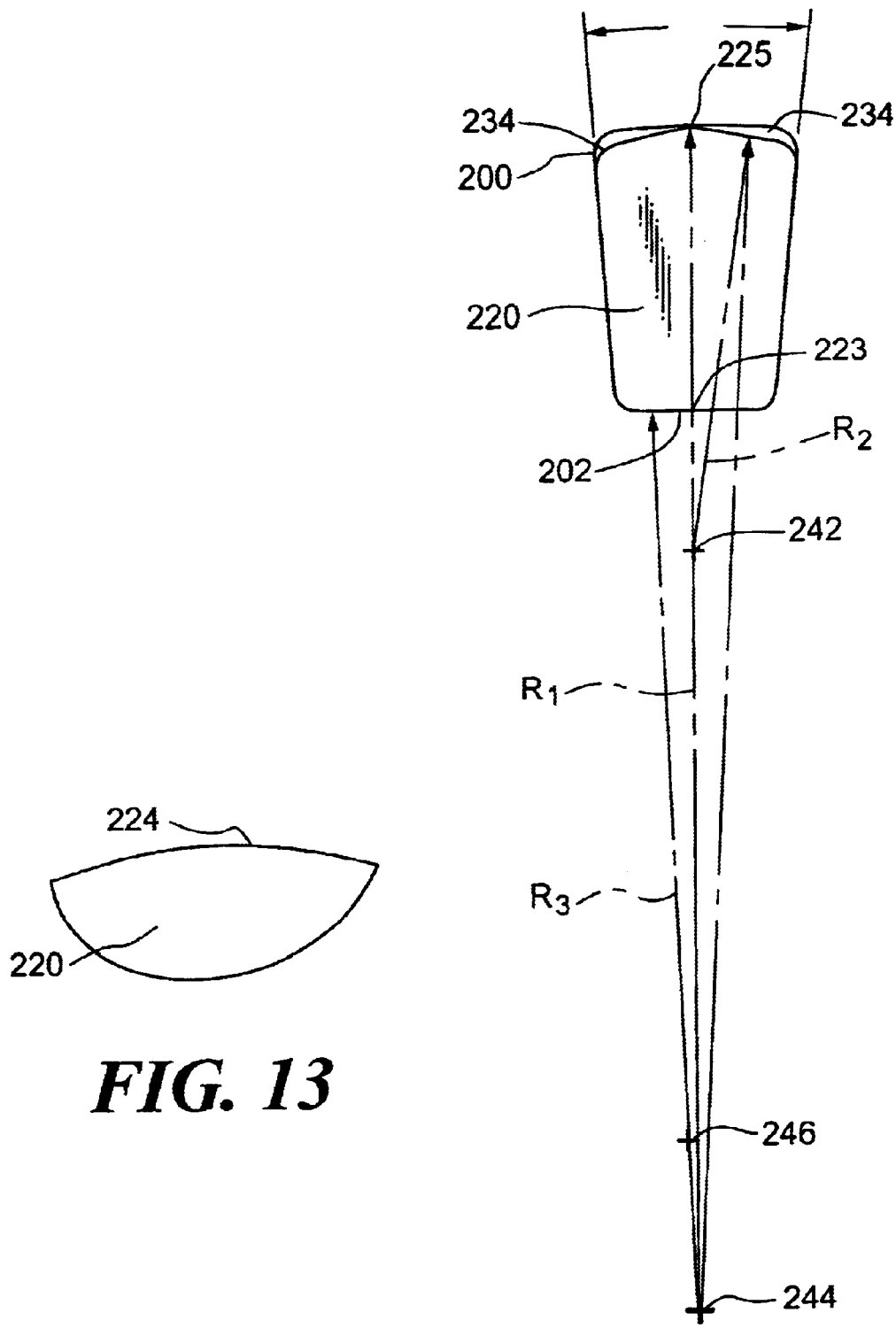
FIG. 12 the opening of FIG. 10, and identifies illustrative dimensions.
FIG. 13 shows a magnet according to another embodiment of the invention.
Figure 14:
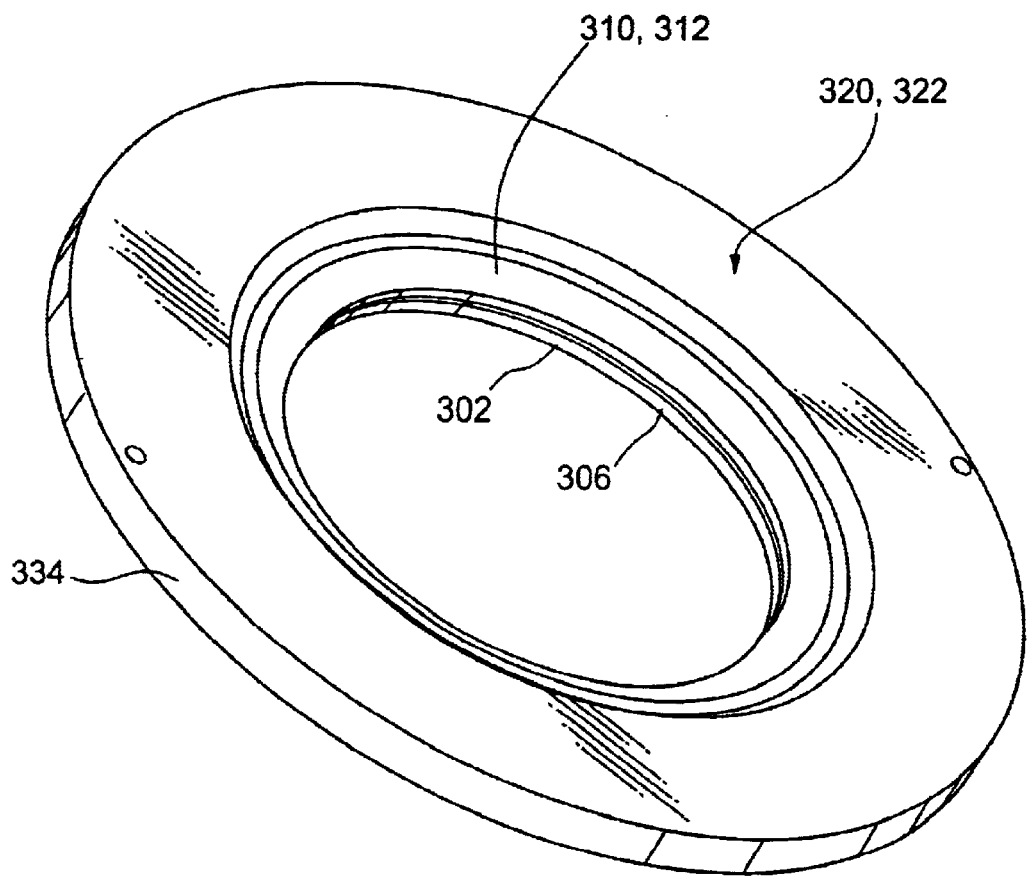
FIG. 14 shows a perspective backiron plate and coupler according to a preferred embodiment of another aspect of the invention, and for use as part of the rotor assembly shown in FIG. 1.
Figure 17:
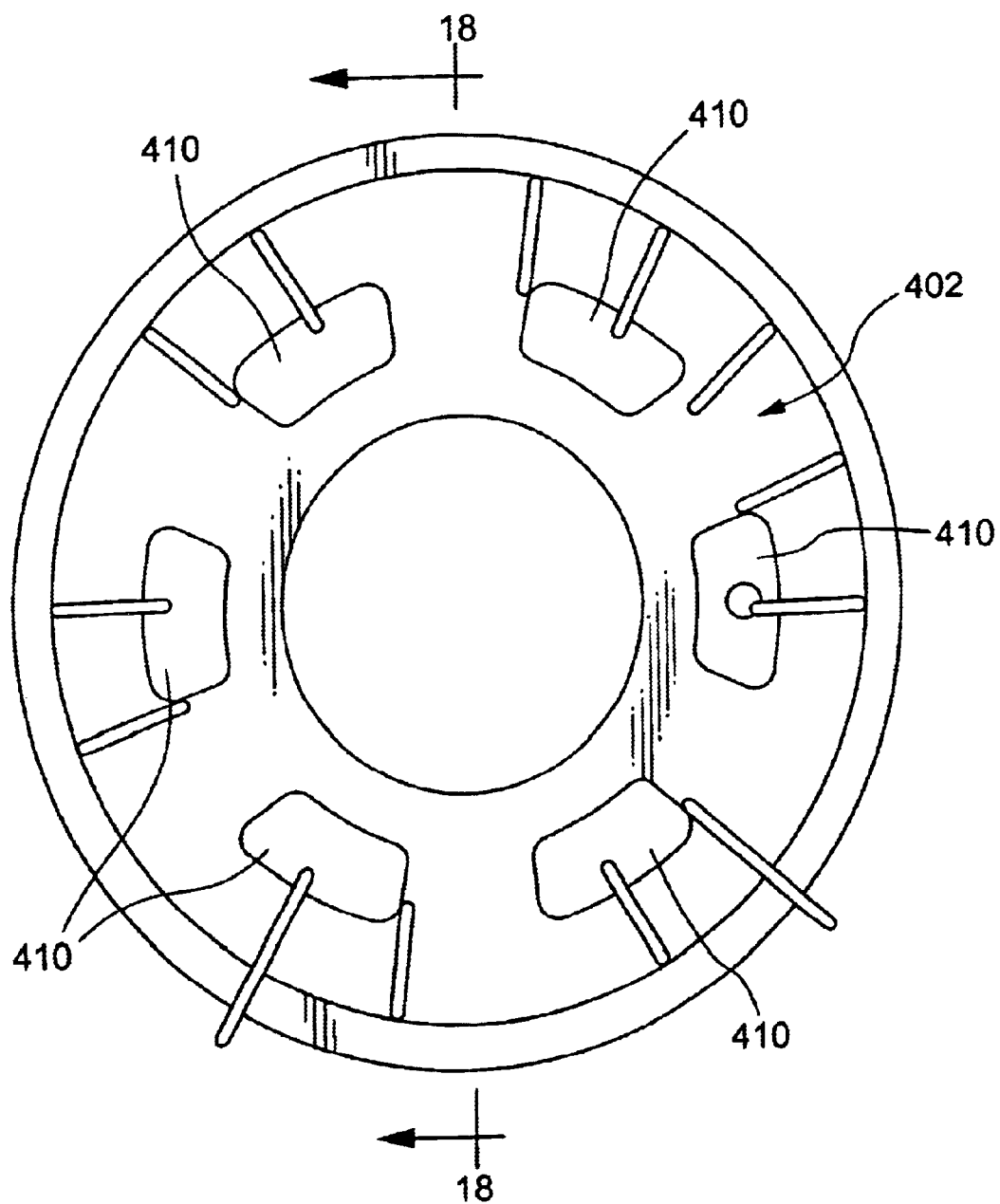
FIG. 17 is an axial view of a stator assembly for the motor-generator shown in FIG. 1.
Figure 20:
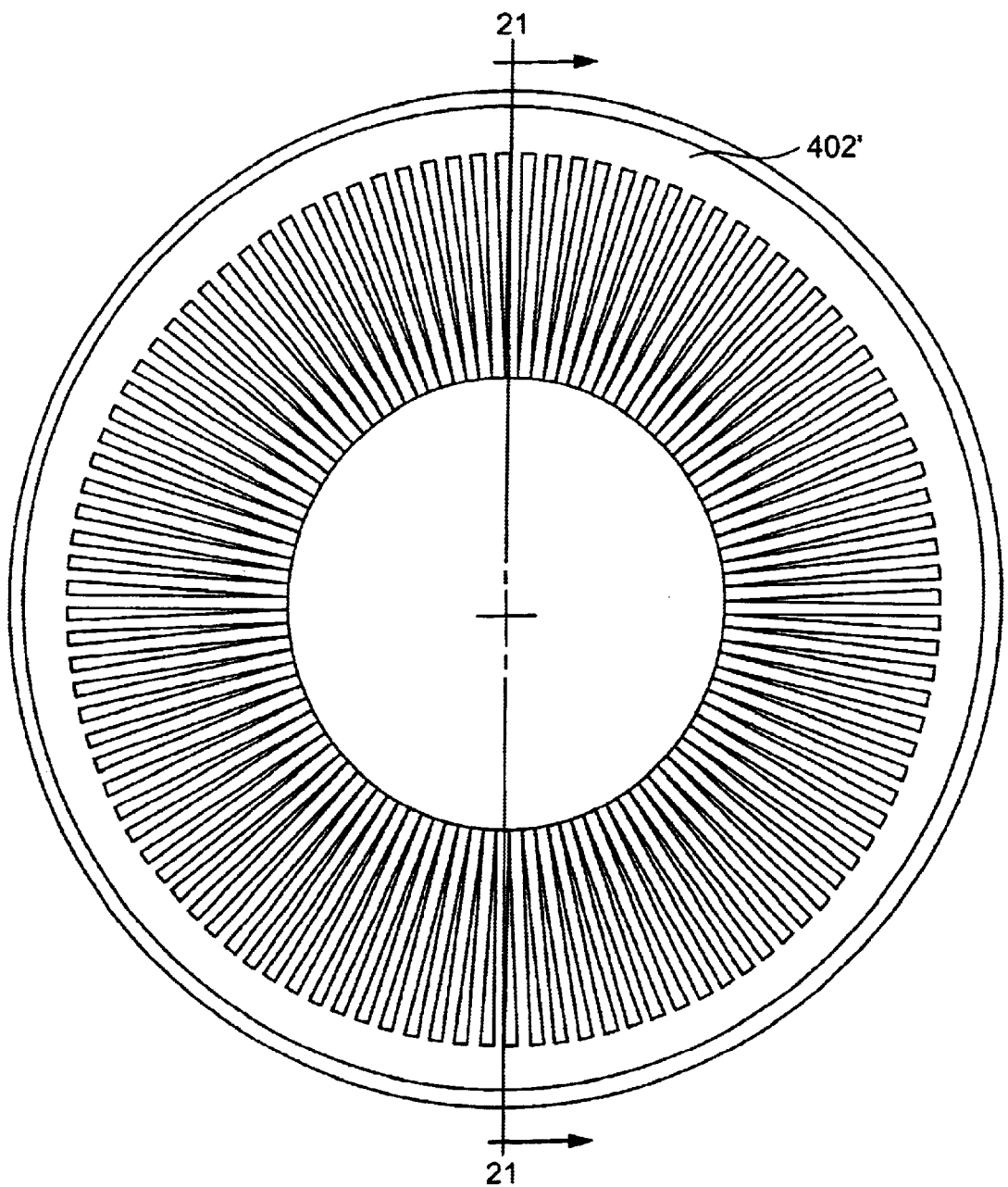
FIG. 20 shows an axial view of an alternative stator assembly to the one shown in FIG. 17.

Illustrative dimensions for openings 200 and magnets 220 according to the preferred embodiments and methods of the invention will now be described and shown with reference to FIG. 12, which shows a sample one of the openings 200 and magnets 220 at rest. These dimensions are provided merely as examples, however, and are not necessarily to be construed as limiting in their particulars. In the specific example of motor-generator 100, the radial length of the openings and magnets, i.e., from the centers 203 and 223 of inner edges 202 and 222 to the centers 205 and 225 of outer edges 204 and 224, preferably is about 0.75 inches. The maximum width from side edge 206 to side edge 208, i.e., adjacent to outer edge 204, is about 0.75 inches. The angular span of the magnet and opening combination in this embodiment is about 10 degrees. The magnet, for example, would be dimensioned to about a 10-degree angle, and the opening in the titanium rotor would be cut to about 10.2 degrees. This leaves a small gap or clearance for the inclusion of bonding material, e.g., of about 0.01 inches.

When the motor-generator, including the rotor, is at rest with respect to the housing, a first resting radius R1 extends from a point 240 to outer edge 204 of opening 200, and substantially traces the central portion of opening outer edge 204. A second resting radius R2 extends from a point 242 to outer edge 224 of magnet 220, and substantially traces the central portion of magnet outer edge 224. A third resting radius R3 extends from a point 244 to inner edge 202 of opening 200. In this illustrative preferred embodiment, radius R1 preferably would be about 3.25 inches. R2 preferably is smaller in length than radius R1 by at least about 0.65 inches. In some applications, for example, with titanium rotors, radius R2 preferably is about 80% of radius R1. If different rotor materials are used, this ratio may be different, depending, for example, on the relative modulus of elasticity of the respective materials. This causes the outer edges of the magnet and the opening to substantially mate and conform across the outer edge under operational conditions, thereby reducing or eliminating point or stress concentration loading on the magnet.

The specific shapes and geometries for the magnets and openings as illustrated in the drawings need not necessarily be used, so long as this principle of general conformance of the outer edges or surfaces at operational speeds is used. For example, a rounded or curved edge may be provided for the openings and magnets in lieu of the inner edges and side edges, as shown in FIG. 13.

It would be highly undesirable for the magnets to come away from the rotor during operation. For this reason, the magnets must be retained and secured in the rotor when the motor-generator is operating. Accordingly, the securing means according to this aspect of the invention preferably but optionally includes means for bonding the magnetic field generating means to the rotor means. The bonding means preferably includes a bonding agent, such as an epoxy-based resin adhesive. In a related aspect of the invention, the method preferably but optionally includes disposing a bonding material in the side edged gaps or at least a portion of them, but excluding the bonding material from the outer edge gaps, and preferably from the inner edge gaps as well.

With regard to the preferred embodiment, magnets 220 may be retained in openings 200 using a number of different means or approaches. In the presently preferred embodiments of the invention, the bonding means comprises a bonding material or agent is disposed in side edge gaps 236 and 238 to aid in retaining the magnets in the rotor openings. The bonding material, however, is substantially excluded, and preferably entirely excluded, from inner and outer edge gaps 232 and 234. A reason for this exclusion includes the concern that the bonding material can result in the application of non-uniform forces being applied across the outer edges of the magnets, thus risking their breakage. Even as to side edge gaps 236 and 238, the bonding material preferably is only applied to the central portion of the side edge, for example, only about one third to one half of each side edge.

As implemented in motor-generator 100, the bonding material comprises a highly-compliant epoxy adhesive 250, preferably with large strain to rupture characteristics. As shown in FIG. 10, adhesive 250 is disposed in side edge gaps 236 and 238. Adhesive 250 preferably is excluded entirely from inner edge gap 232 and outer edge gap 234. This can reduce and preferably minimize or eliminate stress concentrations in the magnets.

The rotor, rotor means and/or rotor assembly according to this aspect of the invention are not necessarily limited to use in the axial gap motor-generator herein described. They may, for example, alternatively be used as a component in other types of axial gap motor-generators. In such applications, the design of the rotor and its components preferably would be as described above, and equivalents of them. Some minor design changes may be required to accommodate such alternative application. The means of attaching the rotor to the shaft, for example, may differ. The features and advantages of this rotor design, however, are not necessarily limited to the specific illustrative example provided here.

In accordance with another aspect of the invention, the rotor means may and preferably does include means for concentrating the magnetic field toward the stator means (described below), wherein the concentrating means includes means for aligning the concentrating means with the rotor means when the axial gap motor-generator is operated at the operational speed. The concentrating means preferably comprises a backiron assembly as will now be described. In accordance with a related aspect of the invention, a backiron assembly is provided for use with a rotor, preferably in an axial gap motor-generator, and more preferably in axial gap motor-generators according to the present invention. The backiron assembly includes aligning means, preferably comprising first and second coupling means, which in preferred embodiments respectively comprise first and second couplers operatively coupled to the rotor body to rotate with the rotor. The first coupler is operatively coupled to the first side of the rotor or rotor body and the second coupler is operatively coupled to the second side of the rotor or rotor body. The backiron assembly further includes first and second magnetic field concentrating means positioned on the first and second sides respectively of the rotor or rotor body when the backiron assembly is operated with the rotor for concentrating a magnetic field from the rotor to the stator assembly. The first and second magnetic field concentrating means preferably comprise first and second backiron plates. The first backiron plate is operatively coupled to the first coupler and is positioned on the first side of the rotor. The second backiron plate is operatively coupled to the second coupler and is positioned on the second side of the rotor.

Each of the backiron plates has an outermost edge. The first and second couplers and the respective first and second backiron plates are at respective first and second angles, and these angles preferably are dependently dimensioned so that the outermost edges of the backiron plates tend to remain axially stationary with respect to the axis as the rotor is rotated over a predetermined speed range.

The backiron assembly functions advantageously to direct the magnetic flux lines across the stators, e.g., as a magnetic field flux concentrator, so that preferably a maximum axial field results and the maximum amount of torque is transferred between the rotor and stator. The backiron provides a magnetic surface that directs the magnetic field across the stators and concentrates the magnetic field.

One problem encountered with backiron devices operated at high speeds has been that distortion of the backiron at these operational speeds tends to change the relative spacing between the backiron and the stators. This changes the magnetic field lines, and results in heat losses and decreased efficiency.

In accordance with this aspect of the invention, a backiron assembly is provided that reduces or eliminates this concern. Backiron assemblies according to the present invention can achieve this result by configuring the backiron assembly, and more importantly the backiron plates of that assembly, so that they are disposed with the proper spacing relative to the rotor and stators when they are at or near their operational speeds.

As implemented in the illustrative preferred embodiment, and according to this aspect of the invention, a concentrating means comprising a backiron assembly 300 is provided. Backiron assembly 300 includes an attachment means disposed about a backiron assembly axis corresponding to the axis of rotation 142, for attaching the backiron assembly to the rotor. The attachment means preferably comprises a circular attachment ring or hub 302 for coupling backiron assembly 300 to rotor body 168. More specifically, rotor body 168 includes a threaded portion 304. Attachment ring 302 similarly has a threaded portion 306 for threadably engaging threaded rotor portion 302 to mate them to one another.

Backiron assembly 300 also includes first and second couplers comprising first and second annular fillet tubes 310 and 312, respectively. First coupler 310 is operatively coupled to first side 162 of rotor 160 and second coupler 312 is operatively coupled to second side 164 of rotor 160.

Backiron assembly 300 further includes first and second backiron plates 320 and 322, preferably comprising a steel material. The backiron plates may be laminated to reduce eddy current losses. First backiron plate 320 is operatively coupled to first coupler 310 and is positioned on first side 162 of rotor 160. Second backiron plate 322 is operatively coupled to second coupler 312 and is positioned on second side 164 of rotor 160. Attachment ring 302 and couplers 310 and 312 thus provide a coupling means for coupling the backiron plates to the rotor body.

As noted above, the tendency of backiron plates to flex or distort under the substantial forces exerted during rotation at operating speeds is a severe limitation in rotor-mounted backiron designs. If the backiron plates were simply flat disks and were parallel with respect to first and second rotor planes 174 and 176 at rest, then as the rotor and backiron assembly is spun up to high rotational velocities, the outside portions of backiron plates would tend to move inwardly toward the rotor planes, distorting the field lines and possibly causing portions of backiron plates to destructively contact the stator. The present invention is able to limit or overcome these limitations, for example, by using a backiron assembly that accommodates these forces. To illustrate the principles and related structures involved, the specific orientations of backiron assembly 300 and its components according to the preferred embodiment will now be described.

Backiron plate 320 lies in a first backiron plane 330, and backiron plate 322 similarly lies in a second backiron plane 332. Each backiron plate has an outermost edge 334. It is desirable for the first and second backiron planes 330 and 332 to be parallel to first and second rotor planes 174 and 176 and for the outermost edges of the backiron plates 334 to remain essentially equidistant with respect to rotor planes 174 and 176 as the motor-generator is operated at its operational speed or speed range. This can be accomplished by providing an appropriate coupling means, and positioning that coupling means, e.g., using the conical geometry described herein, so that the forces on the backiron plates at operational speeds tend to deform the backiron plates into the desired position. The backiron plates, for example, can be coupled to coupling means in the form of couplers 310 and 312 so that, as the motor-generator approaches its operation speed, the forces on the backiron plates urge them into a position parallel to rotor planes 174 and 176, and with respect to the stators. This aspect of the invention can help to minimize stresses in the backiron plates and to maintain a nearly constant magnetic flux across the windings of the stator.

To further illustrate, and with reference, for example, FIG. 16, first and second couplers 310 and 312 can be appropriately positioned so that first and second backiron plates 320 and 322 are at respective first and second angles 336 and 338 with respect to rotor planes 174 and 176. These first and second angles can be selected and the components dimensioned with respect to the backiron plates and rotor at rest so that backiron planes 330 and 332 are substantially parallel to rotor planes 174 and 176 and outermost edges 334 of the backiron plates tend to remain stationary with respect to axis 142 as rotor 160 is rotated over a predetermined speed range, e.g., the operational speed or operational speed range of motor-generator 100. The desired angles 336 and 338 of the backiron planes with respect to the rotor planes respectively, preferably lie within a range of about 1 degree to about 3 degrees. An angle of about 2 degrees is preferred. In accordance with the preferred embodiment of this aspect of the invention, and to provide a more specific example, according to this aspect, backiron planes 330 and 332 have angles 336 and 338 of about 2 degrees with respect to rotor planes 174 and 176, respectively, when rotor 160 and backiron plates 320 and 322 are at rest with respect to housing 102. The backiron plates according to this design thus have a conical inclination with respect to the rotor planes.

The axial gap motor-generator also includes a stator means positioned adjacent to the magnetic field generating means for interacting with the magnetic field to generate an electrical voltage. The stator means preferably comprises a stator assembly positioned adjacent to the rotor. The stator assembly in the preferred embodiment is designed to produce three-phase electrical power. The stator assembly also includes a pair of annular disc-shaped stators of nonmagnetic, and preferably highly electrically resistive, material, such as a ceramic, an alumina or graphite composite, having first and second opposing surfaces comprising first and second stator cores. The stator surfaces and cores are adjacently spaced on each side of the rotor. Each stator core includes a plurality of windings located proximate to the magnets in the rotor. In the preferred embodiment, six coils or windings are provided for each phase. The windings appear as raised kidney-shaped windings. Each coil in this embodiment includes about 20 turns of copper wire, preferably comprising a standard gauge wire as generally known in the field for axial gap motor-generators. The cores and windings are positioned about 40 degrees apart on opposite sides so that the resulting phase angle of the electrical power outputted during generation phase is about 120 degrees.

Figure 3:
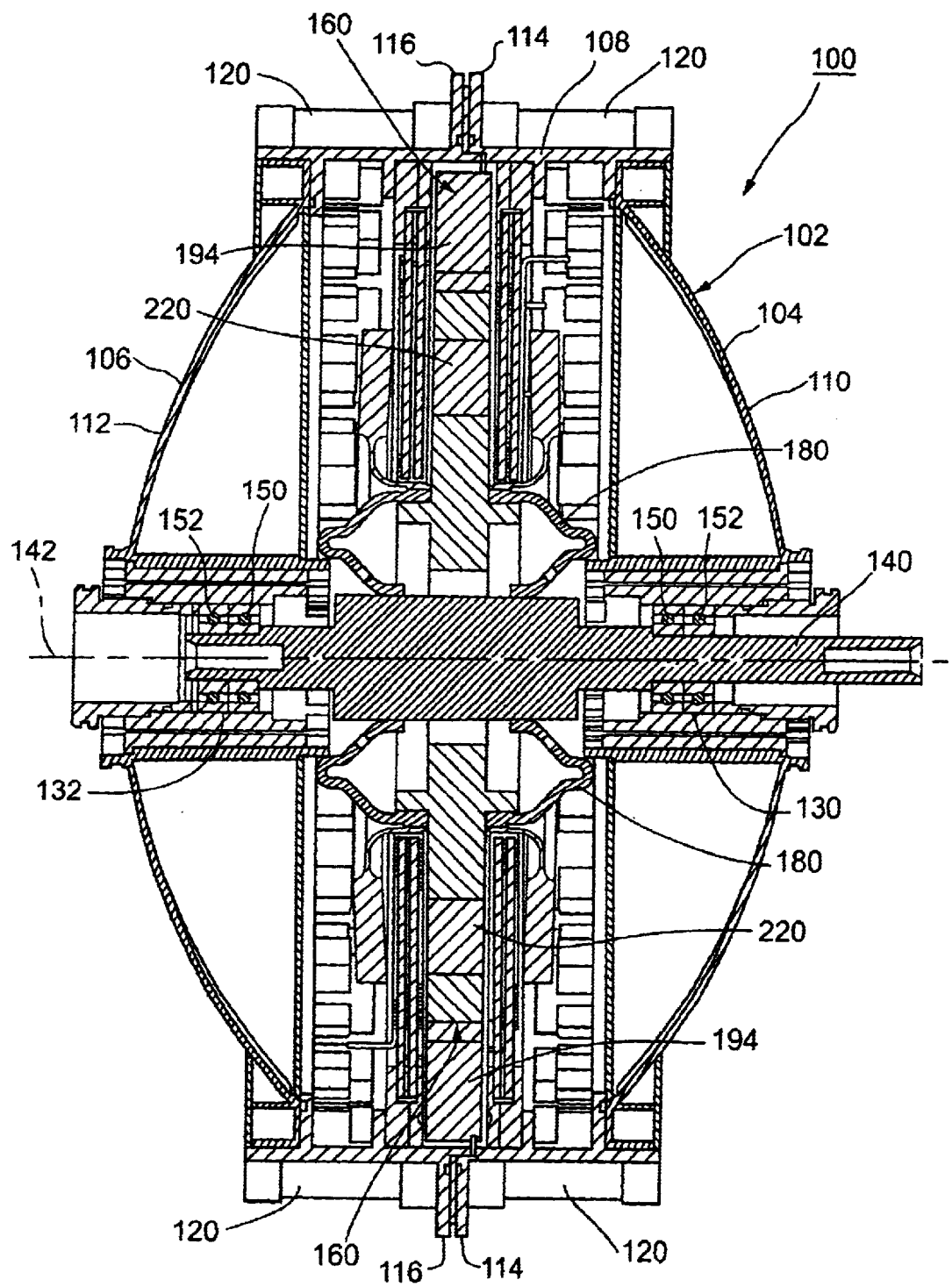
FIG. 3 shows a side or radial cutaway view of the axial gap motor-generator of FIG. 1.
Figure 4:
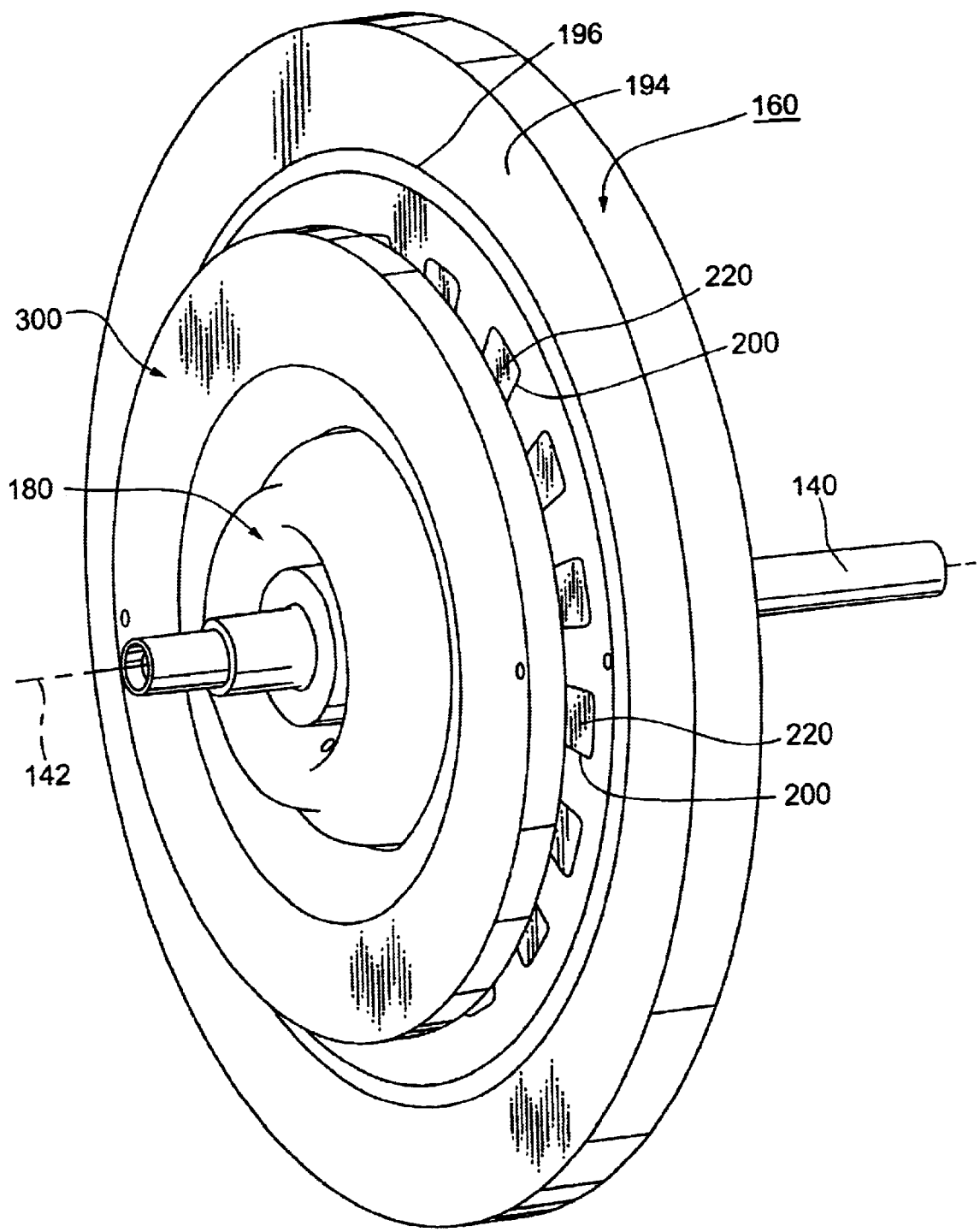
FIG. 4 shows a perspective view of a rotor assembly as used in the axial gap motor-generator of FIG. 1.
Figure 5:
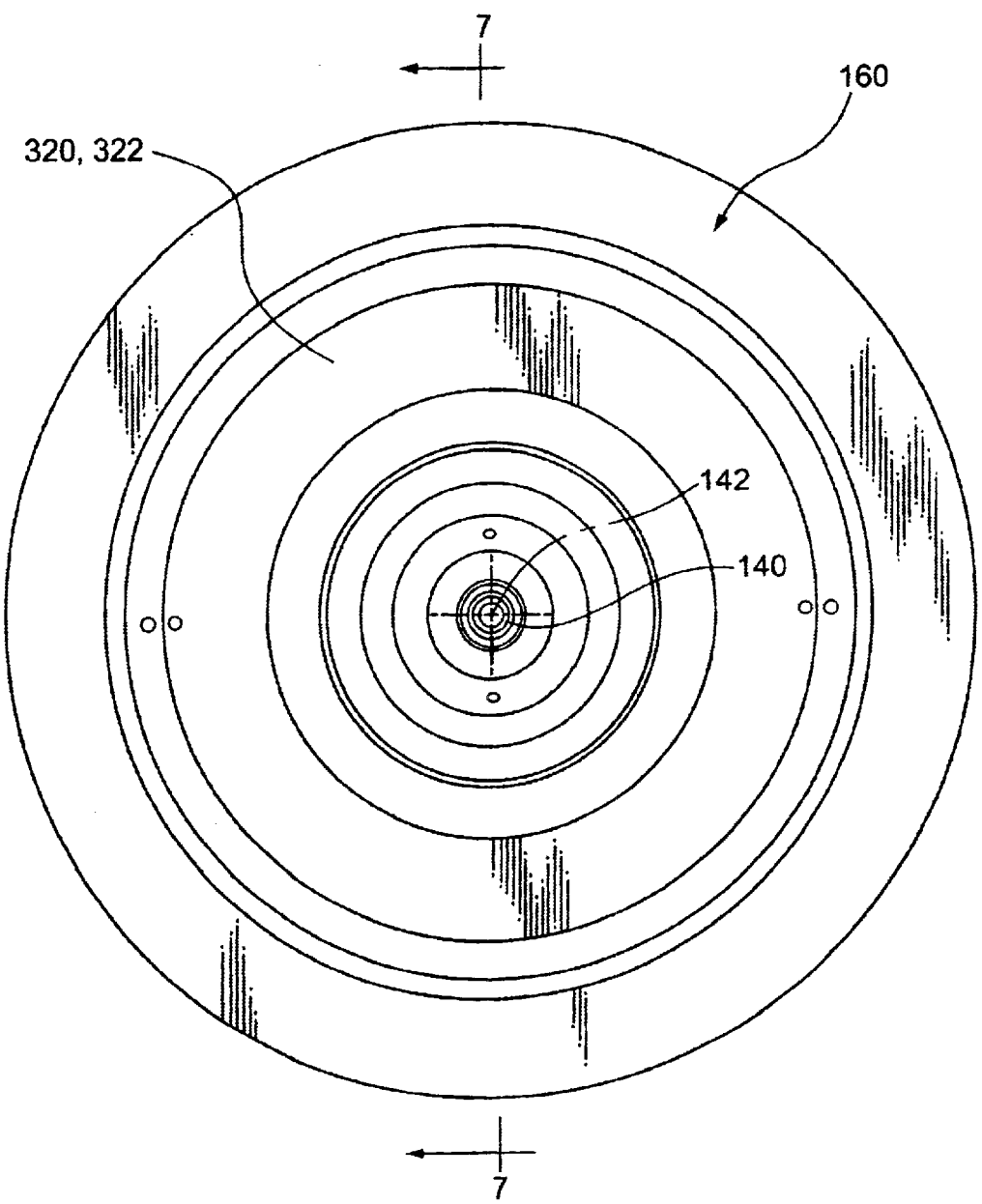
FIG. 5 shows an axial view of the rotor assembly shown in FIG. 4.

As specifically implemented in axial gap motor-generator 100, a stator assembly 400 is provided, as shown, for example, in FIGS. 1 and 3. Stator assembly 400 includes a pair of annular disc shaped stators 402 of nonmagnetic, highly electrically resistive material. Stators 402, for example, may comprise an alumina or carbon graphite material. Each of stators 402 has first and second opposing surfaces 404 and 406, respectively.

Each of the stators is fixedly coupled to the interior of housing 102 at cylindrical wall 108 and extends downward radially toward axis 142. Lead interface shims 408 are positioned between housing 102 on its interior and stators 402, and are coupled to aluminum flanges 409 fixedly disposed on the interior of cylindrical wall 108. Shims 408 facilitate the removal of heat from stators 402 to housing 102, where it can be dissipated or otherwise removed. Stator surfaces 402 and 404 are adjacently spaced on each side of rotor 160. Each stator includes a plurality of cores and windings 410, preferably comprising copper wire, located proximate to magnets 220 in rotor 160. In this preferred embodiment, windings 410 are comprised of copper wire wound on a substantially non-magnetic, highly electrically resistive core that will not generate significant heat, as noted above. Stators 402 and stator windings 410 thus are fixedly mounted to the interior of housing 102 and remain stationary with respect to it.

Stators 402 and stator windings 410 are positioned with respect to rotor 160 so that rotor surfaces 162 and 164 are spaced from but immediately adjacent to stator windings 410. These components are positioned with respect to one another so that, as rotor 160 rotates during operation, magnets 220 pass immediately adjacent to stator windings 410.

Backiron plates 320 and 322 are positioned with respect to stators 402 so that backiron planes 330 and 332 are substantially parallel with respect to the broad surfaces of stators 402 and backiron plates 320 and 322 are adjacent to stator windings 410 during operation of the motor-generator.

An alternative stator assembly is shown in FIGS. 18 and 19. This stator design includes stator cores and windings as more generally known in the axial gap motor-generator field. It includes a pair of stator surfaces that in turn include alumina cores and copper wire windings. The stator material used in this alternative embodiment comprise a MACOR brand ceramic, although other ceramic materials having high heat transfer characteristics can be utilized if desired.

It is desirable in the design and operation of rotary devices such as axial gap motor-generators to limit or isolate vibrations that normally occur in the device, particularly those arising in and about the shaft. In accordance with another aspect of the invention, an apparatus is provided for coupling a shaft and bearing assembly to a housing in a manner that can address this issue. The apparatus comprises outer sleeve means, preferably in the form of an outer sleeve, for coupling to the housing, and inner sleeve means, preferably in the form of an inner sleeve, disposed annularly within the outer sleeve means for coupling to the shaft and bearing assembly. The outer and inner sleeve means form an annular gap. The annular gap comprises vibration absorbing means, for example, such as a bump foil material, for absorbing vibrations between the outer and inner sleeve means. The outer and inner sleeve means include coupling means for coupling the outer and inner sleeves to one another. The coupling means preferably comprise stanchion means for providing an attachment point and fastening means for fastening the stanchion means to one another.

Figure 21:
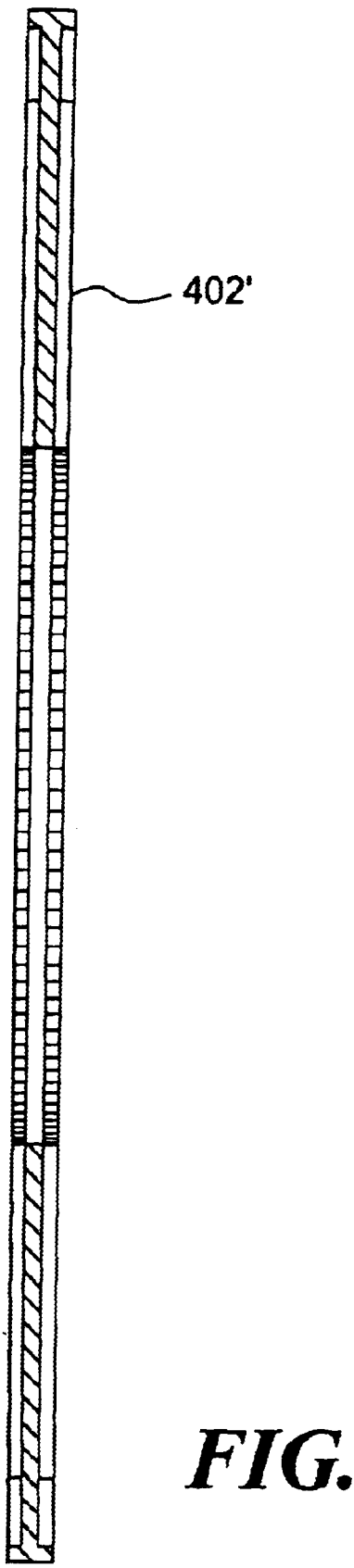
FIG. 21 provides a side cutaway view of the stator assembly shown in FIG. 20.
Figure 22:
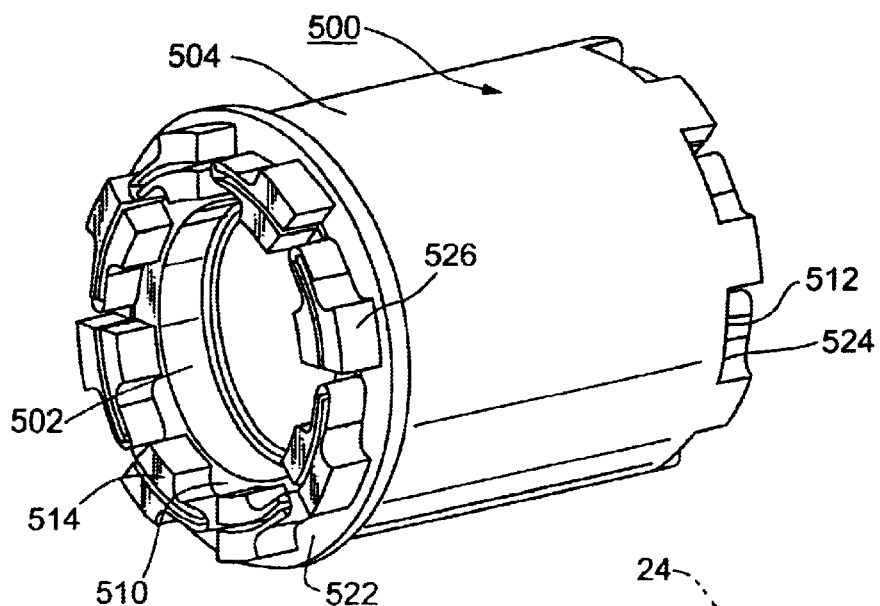
FIG. 22 shows a perspective view of a vibration isolator according to a preferred embodiment of another aspect of the invention, suitable for use in the axial gap motor-generator of FIG. 1.
Figure 23:
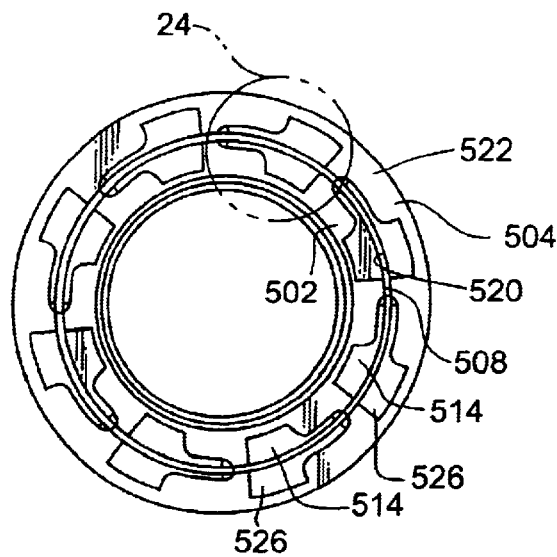
FIG. 23 shows an end or axial view of the vibration isolator of FIG. 22.

As implemented in the axial gap motor-generator of the preferred embodiment, an apparatus according to this aspect of the invention in the form of a vibration isolator 500 will now be described with specific reference to FIGS. 21–23.

Vibration isolator 500 comprises inner sleeve means comprising an inner sleeve 502 and outer sleeve means comprising outer sleeve 504. Inner sleeve 502 comprises a cylindrical tube made of steel, inconel, or the like. Inner sleeve 502 couples to shaft 140 and its bearing assembly. This may be done, for example, by pressing the mechanical bearings for shaft 140 into this inner sleeve. Inner sleeve 502 has an exterior surface 508 and a pair of longitudinal edges 510 and 512. Each of the longitudinal edges 510 and 512 includes stanchion means comprising a plurality of stanchions 514.

Outer sleeve 504 couples to housing 102. Outer sleeve 504 has an interior surface 520 and a pair of longitudinal edges 522 and 524. Each of the longitudinal edges 522 and 524 includes stanchion means comprising a plurality of mating stanchions 526 corresponding in number and location to the outer sleeve stanchions 514. Corresponding ones of stanchions 514 and 526 (mated stanchions) thereby form a plurality of stanchion pairs, which in turn in this embodiment comprise the stanchion means.

Inner sleeve 502 is disposed within outer sleeve 504 to form an annular gap or cavity 530 between the exterior surface of the inner sleeve and the interior surface of the outer sleeve.

Vibration absorbing means, preferably in the form of a vibration absorbing material, is disposed in annular cavity 530. The vibration absorbing material may be any material suitable for absorbing the vibrations sought to be contained or countered. Presently preferred vibration absorbing materials include bump foils and vibration damping materials. One such material is Miti Radial Bump Foil Vibration Isolator/Damper, commercially available from Mohawk Innovative Technologies of Albany, N.Y.

Vibration isolator 500 further includes fastening means for fastening the stanchion means to one another. The fastening means, for example, comprise a plurality of couplers, each of the couplers corresponding to one of the stanchion pairs, and each of the couplers coupling the corresponding stanchion pair together. The couplers preferably comprise C-shaped flexures 540. Each C-shaped flexure is used to clamp a pair of the stanchions to one another. The C-shaped flexures preferably are welded, and more preferably by tack or spot welding, to the stanchions. This arrangement can help to prevent rotation of the inner and outer sleeves with respect to one another. It also can aid in providing desired axial stiffness so that the shaft does not move significantly in an axial direction.

Once the vibration isolator is properly assembled as described above, the entire assembly, including the shaft bearing assembly, and be pressed onto the shaft.

In accordance with yet another aspect of the invention, a housing is provided for a motor-generator in which the housing can provide vibration isolation and thermal dissipation. Similarly, a method is provided for reducing vibrations in a housing for a rotational motor.

The method according to one aspect and in general terms involves analyzing the motor-generator at an operational speed to determine a motor-generator resonance, and constructing the housing so that the housing does not resonate at the motor-generator resonance. This may be done, for example, by instrumenting the motor-generator and directly measuring its vibrational characteristics during operation. It also may be done by simulating the operating characteristics of the motor-generator and obtaining from the simulation its vibrational characteristics. These vibrational characteristics include resonant frequency, typically including first, second, third and so on, fundamental resonant frequencies. The vibrational characteristics may be obtained for the entire motor-generator, including the housing, or alternatively, they may be obtained, for example, by simulation, only for the components other than the housing.

Once these vibrational frequencies are known, the housing can be constructed in a manner that the housing itself does not resonate at the resonant frequencies of the motor-generator, or so that the housing minimizes the overall vibration of the fully-assembled and operational motor-generator. Structural adaptations of the housing that can be used to achieve the desired vibrational characteristics may include the materials used to construct the housing, the thicknesses or other dimensions of housing components, the positioning of supports such as ribs, etc. The use of vibration isolation components, such as shims 408 and vibration isolator 500 also may be used to facilitate vibrational isolation.

Housing 102 as described above comprises a housing in accordance with the preferred embodiment of this aspect of the invention. Housing 102 is constructed using the techniques identified herein above so that it minimizes the vibration of the assembled motor-generator 100.

To manage and preferably minimize thermal concerns, motor-generator 100 is designed as herein described to limit the amount of heat that is generated. This heat minimization includes, for example, the selection of materials as described above, the use of backiron assembly 300, the use of lead shims 408, etc. To the extent that heat is generated during the operation of motor-generator 100, housing 102 aids in the dissipation of that heat, for example, using external ribs 120.

The operation of axial gap motor-generator 100 will now be described in connection with related methods according to the invention. It will be understood, however, that the methods according to the invention are not necessarily limited to the illustrative and representative embodiments and components as specifically shown and described herein.

During a generator phase in which motor-generator 100 is operated as an electrical power generator, rotational force is applied to shaft 140, for example, by a motor or turbine (not shown) connected to shaft 140 via a transmission device (also not shown). This causes rotor 160, including backiron assembly 300, to rotate about shaft 140 and axis 142. As magnets 220 pass by stator windings 410, the rotating magnetic field associated with magnets 220 generate a voltage in stator windings 410, which in turn causes an electric current to be generated to a resistive load. Backiron plates 320 and 322 cause the magnetic field to be directed substantially axially across stator windings 410, thus increasing the efficiency of motor-generator 100.

As the rotational speed of rotor 160 increases to its operational speed, outer edge 204 of openings 200 begins to distort. At rest and at lower operational speeds, the outer edges 224 of magnets 220 have a greater degree of curvature than outer edge 204 of the openings 200. This outer edge 224 of magnets 220 therefore contacts outer edge 204 of openings 200 only at and about center point 225. As the operational speed of the device is approached and attained, outer edge 204 of openings 200 distorts to assume a greater degree of curvature. At the operational speed, the extent of this curvature of outer edge 204 is such that it substantially matches and conforms to magnet outer edge 224, substantially minimizing and/or eliminating stress concentrations.

As operational speeds are approached, backiron plates 320 and 322 are subjected to substantial centrifugal forces that tend to distort their position. Because backiron plates 320 and 322 have been predisposed with an appropriate angle relative to rotor planes 174 and 176, which in this embodiment is about 2 degrees, these forces tend to deform backiron plates 320 and 322 into the desired operational position, i.e., in which they are substantially parallel to the rotor planes and thus direct the magnetic field lines directly perpendicular with respect to stator windings 410. This has the effect not only of preventing catastrophic contact of backiron plates 320 and 322 with stators 402, but also of improving the efficiency and power output of the motor-generator.

It is inevitable that some eddy currents and thermal losses will occur in axial gap motor-generators of the type herein described. Such losses can be significantly reduced, as noted above, using the structures as described hereinabove, for example, including rotor 160, backiron assembly 300, and iron-less stator 402. To the extent that heat is generated during operation of the motor-generator, lead shims 408 will tend to regulate the transfer of that heat to housing 102. As thermal energy is transferred to housing 102, that energy is conducted and convected from it by flanges 114 and 116, and by ribs 120 on the exterior of the housing. With this combination of thermal energy avoidance and thermal energy dissipation technique, the adverse effects of unwanted heat and temperature can be significantly lessened or avoided.

The operation of motor-generator in a motor phase is directly opposite the generator phase. Electrical power is applied across stator windings 410 to induce an opposing magnetic force on magnets 220 of rotor 160, thereby causing rotor 160 to rotate, or to continue rotating at a greater rotational speed.

In accordance with still another aspect of the invention, a system is provided for converting power. The system comprises a shaft assembly having an axis of rotation, at least one flywheel and preferably two, coupled to the shaft assembly, and an axial gap motor-generator coupled to the shaft assembly. The motor-generator preferably is constructed as described hereinabove.

Figure 24:
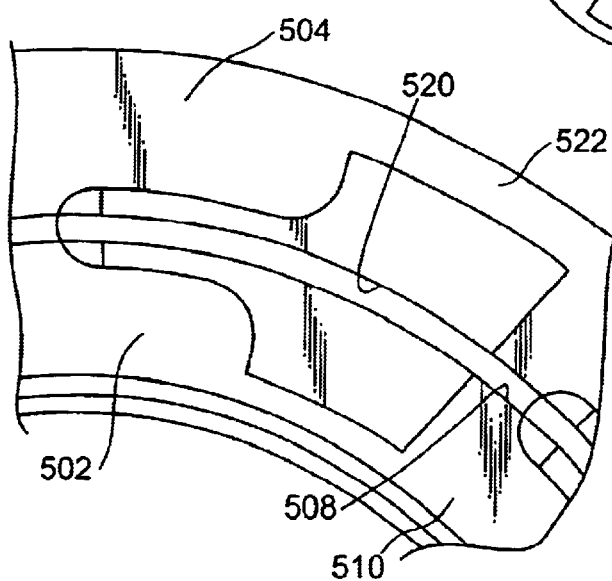
FIG. 24 shows an enlarged view of the portion of the vibration isolator shown in FIG. 22, identified by the circle 24 in FIG. 23.
Figure 25:
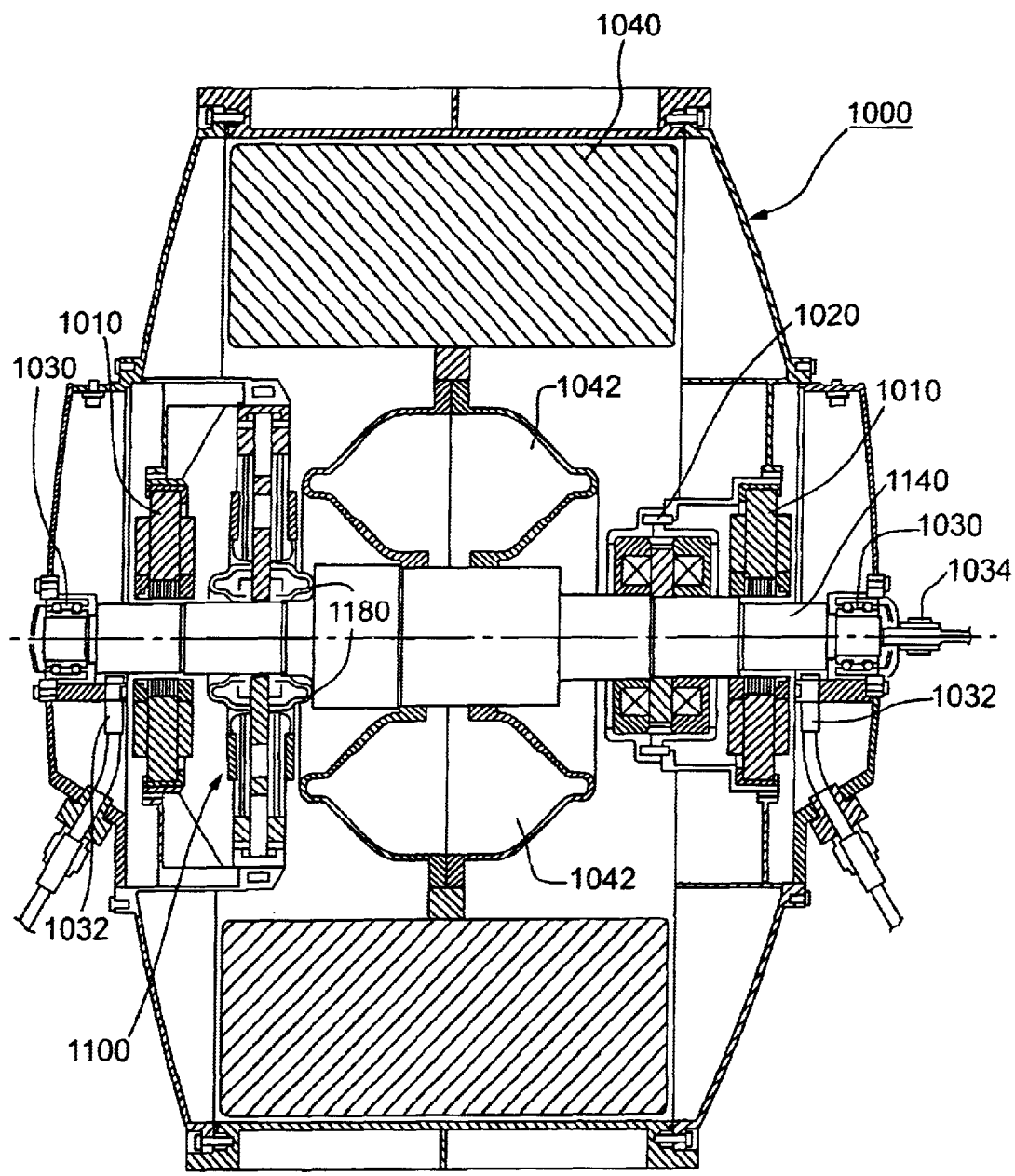
FIG. 25 shows a power conversion system according to a preferred embodiment of another aspect of the invention, taken from a side or radial view.

A system 1000 according to a presently preferred embodiment of this aspect of the invention is shown in FIG. 24. System 1000 includes a shaft assembly comprising a shaft 1140. A set of magnetic bearings 1010 is provided at each end of shaft 1140. A magnetic thrust bearing 1020 also is provided at one end of the shaft 1140 to limit axial movement of the shaft. In addition, a set of catcher bearings 1030 is provided at each end of shaft 1140. Catcher bearings 1030 provide a backup system for maintaining shaft 1140 in rotation in the event the main magnetic bearings fail. Catcher bearings 1030 may comprise mechanical ball-bearing designs, for example, using ceramic balls and high-vacuum lubricant, with appropriate journaling or races. If the particular application involves a space-based or low-pressure environment, a design that does not utilize mechanical contact or lubricants that can vaporize or sublime may be preferred. If power to radial magnetic bearings and thrust magnetic bearing fails, shaft 1140 drops onto catcher bearings 1030, which support shaft 1140 in rotational relation so that the shaft does not contact the support structures and destruct from the resulting friction. Other types of backup systems are possible to provide backup in the event of failure of the main magnetic bearing system. A pair of optical probes 1032 is appropriately mounted and directed to monitor the condition of the respective magnetic radial bearings 1010. Optical probes 1032 sense shaft motion and feed the information back into a closed loop control system for the radial magnetic bearings. An optical probe 1034 also is provided for monitoring thrust magnetic bearing.

A flywheel assembly 1040 is coupled to shaft 1140 by an expandable hub 1042 substantially identical to hub 180, but larger in size. A motor-generator 1100 essentially identical to motor-generator 100 except for the absence of composite ring 194 is coupled to shaft 1140 at an expandable hub 1180.

System 1000 may be advantageously employed, for example, in a satellite system having solar collectors (not shown). During periods of time when electrical energy is available to the solar collectors, this electrical energy can be inputted into motor-generator 1100 in its motor phase to spin up flywheel assembly 1040, and thereby store the energy as kinetic energy in the rotation of the flywheel. When solar energy is no longer available to the solar collectors, motor-generator 1100 can be used in its generator phase to draw kinetic energy stored in flywheel assembly 1040 and convert it to electrical energy to power the supporting satellite or platform.

In this application, and as an illustrative example, the flywheel may have an outer diameter of about 16 inches and a total exterior axial length of about 8 inches.

System 100 may be used for power conversion, essentially as described above. When it is desired to convert the kinetic energy stored in the flywheels to electrical energy, motor-generator is operated in its generator phase. Kinetic energy is drawn from one or both of the flywheels via the shaft and used by the motor-generator to generate electrical power. This electrical power may be used, for example, to charge a battery or battery assembly. When it is desired to use electrical power to add kinetic energy to one or both of the flywheels, motor-generator is operated in its motor phase to rotate the shaft, thereby increasing the speed of the flywheels.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An axial gap motor-generator of the type coupled to a shaft having an axis of rotation, the motor-generator comprising:

a rotor having a rotor body rotatably disposed about the shaft and having an outer region, the rotor including a plurality of openings disposed in the outer region and spaced from one another, each of the openings including an outer edge;

a plurality of magnets equal in number to the openings, each of the magnets including an outer edge corresponding to the outer edge of a corresponding one of the openings, the outer edge of the magnets generally being non-conformal to and being slightly smaller than the outer edge of the openings, and each of the magnets being shaped to be inserted into the corresponding one of the openings, the outer edge of each of the openings having a first resting radius when the axial gap motor-generator is at rest, and the outer edge of each of the magnets having a second resting radius when the axial gap motor-generator is at rest, wherein the first resting radius is larger than the second resting radius; and a stator assembly positioned adjacent to the rotor, the stator assembly including windings positioned to be adjacent to the magnets when the rotor is rotated.

2. An axial gap motor-generator as recited in claim 1, wherein the second resting radius is about 80% of the first resting radius.

3. An axial gap motor-generator of the type coupled to a shaft having an axis of rotation, the motor-generator comprising:

a rotor having a rotor body rotatably disposed about the shaft and having an outer region, the rotor including a plurality of openings disposed in the outer region and spaced from one another, each of the openings including an outer edge;

a plurality of magnets equal in number to the openings, each of the magnets including an outer edge corresponding to the outer edge of a corresponding one of the openings, the outer edge of the magnets generally being non-conformal to and being slightly smaller than the outer edge of the openings, and each of the magnets being shaped to be inserted into the corresponding one of the openings, the outer edge of each of the openings having a first operating radius when the axial gap motor-generator is at an operational speed, and the outer edge of each of the magnets having a second operating radius when the axial gap motor-generator is at the operational speed, wherein the first operating radius is substantially equal to the second operating radius; and a stator assembly positioned adjacent to the rotor, the stator assembly including windings positioned to be adjacent to the magnets when the rotor is rotated.

4. An axial gap motor-generator of the type coupled to a shaft having an axis of rotation, the motor-generator comprising:

a rotor having a rotor body rotatably disposed about the shaft and having an outer region, the rotor including a plurality of openings disposed in the outer region and spaced from one another, each of the openings including an outer edge;

a plurality of magnets equal in number to the openings, each of the magnets including an outer edge corresponding to the outer edge of a corresponding one of the openings, the outer edge of the magnets generally being non-conformal to and being slightly smaller than the outer edge of the openings, and each of the magnets being shaped to be inserted into the corresponding one of the openings;

a stator assembly positioned adjacent to the rotor, the stator assembly including windings positioned to be adjacent to the magnets when the rotor is rotated;

the axial gap motor-generator having an operational speed; and the outer edge of each of the magnets being dimensioned to substantially conform to the outer edge of the corresponding one of the openings when the axial gap motor-generator is operated at the operational speed and the outer edge of the corresponding one of the openings is thereby deformed.

5. An axial gap motor-generator of the type coupled to a shaft having an axis of rotation, the motor-generator comprising:

a rotor having a rotor body rotatably disposed about the shaft and having an outer region, the rotor including a plurality of openings disposed in the outer region and spaced from one another, each of the openings including an outer edge, the rotor including a first side and a second side;

a plurality of magnets equal in number to the openings, each of the magnets including an outer edge corresponding to the outer edge of a corresponding one of the openings, the outer edge of the magnets generally being non-conformal to and being slightly smaller than the outer edge of the openings, and each of the magnets being shaped to be inserted into the corresponding one of the openings;

a stator assembly positioned adjacent to the rotor, the stator assembly including windings positioned to be adjacent to the magnets when the rotor is rotated; and a backiron assembly coupled to the rotor and rotatably mounted about the axis, the backiron assembly including an attachment device rotatably disposed about the axis, first and second couplers coupled to the attachment device, the first coupler being positioned on the first side of the rotor and the second coupler being positioned on the second side of the rotor, and first and second backiron plates disposed adjacent to but spaced from the windings of the stator assembly, the first backiron plate being coupled to the first coupler and being positioned on the first side of the rotor, and the second backiron plate being coupled to the second coupler and being positioned on the second side of the rotor.

6. An axial gap motor-generator as recited in claim 5, wherein each of the first and second couplers comprises an annular tube.

7. An axial gap motor-generator as recited in claim 5, wherein the attachment device is coupled to the rotor body.

8. An axial gap motor-generator as recited in claim 7, wherein the attachment device is threadably engaged with the rotor body.

9. An axial gap motor-generator as recited in claim 5, wherein:

the axial gap motor-generator operates at an operational speed;

the first rotor side is disposed in a first rotor plane and the second rotor side is disposed in a second rotor plane substantially parallel to the first rotor plane; and the first backiron plate is disposed in a first backiron plane and the second backiron plate is disposed in a second backiron plane, the first and second backiron plates being disposed with respect to the first and second rotor planes when the rotor is at rest so that the first backiron plane is substantially parallel to the first rotor plane and the second backiron plane is substantially parallel to the second rotor plane when the axial gap motor is operated at the operational speed.

10. An axial gap motor-generator as recited in claim 5, wherein:

the first rotor side is disposed in a first rotor plane; and the first backiron plate is disposed in a first backiron plane, the first backiron plate being disposed with respect to the first rotor plane when the rotor is at rest so that the first backiron plane forms an angle of about 1 to 3 degrees with respect to the first rotor plane.

11. An axial gap motor generator as recited in claim 10, wherein the angle is about 2 degrees.

12. An axial gap motor-generator as recited in claim 5, wherein:

the second rotor side is disposed in a second rotor plane; and the second backiron plate is disposed in a second backiron plane, the second backiron plate being disposed with respect to the second rotor plane when the rotor is at rest so that the second backiron plane forms an angle of about 1 to 3 degrees with respect to the second rotor plane.

13. An axial gap motor as recited in claim 12, wherein the angle is about 2 degrees.

14. An axial gap motor-generator as recited in claim 5, wherein the first and second backiron plates have a conical inclination toward the rotor.

15. An axial gap motor-generator of the type coupled to a shaft having an axis of rotation, the motor-generator comprising:

a rotor having a rotor body rotatably disposed about the shaft and having an outer region, the rotor including a plurality of openings disposed in the outer region and spaced from one another, each of the openings including an outer edge;

a plurality of magnets equal in number to the openings, each of the magnets including an outer edge corresponding to the outer edge of a corresponding one of the openings, the outer edge of the magnets generally being non-conformal to and being slightly smaller than the outer edge of the openings, and each of the magnets being shaped to be inserted into the corresponding one of the openings;

a stator assembly positioned adjacent to the rotor, the stator assembly including windings positioned to be adjacent to the magnets when the rotor is rotated; and a vibration isolator for coupling the shaft to a housing, the vibration isolator comprising an inner sleeve for coupling to the shaft, the inner sleeve having an exterior surface and a pair of longitudinal edges, each of the longitudinal edges including a plurality of stanchions, an outer sleeve for coupling to the housing, the outer sleeve having an interior surface and a pair of longitudinal edges, each of the outer sleeve longitudinal edges including a plurality of outer sleeve stanchions corresponding in number and location to the inner sleeve stanchions and thereby forming a plurality of stanchion pairs, the inner sleeve being disposed within the outer sleeve to form an annular cavity between the exterior surface of the inner sleeve and the interior surface of the outer sleeve, a vibration absorbing material disposed in the annular cavity, and a plurality of couplers, each of the couplers corresponding to one of the stanchion pairs, and each of the couplers coupling the corresponding stanchion pair together.

16. An axial gap motor-generator as recited in claim 15, wherein each of the couplers comprises a C flexure.

* * * * *